United States Patent
Lin

(10) Patent No.: US 11,595,928 B2
(45) Date of Patent: Feb. 28, 2023

(54) METHOD AND APPARATUS FOR LARGE PROPAGATION DELAY IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

(*) Notice: Subject to any disclaimer, the term of this patent is extended or adjusted under 35 U.S.C. 154(b) by 66 days.

(21) Appl. No.: 17/036,322

(22) Filed: Sep. 29, 2020

(65) Prior Publication Data
US 2021/0105731 A1    Apr. 8, 2021

Related U.S. Application Data

(60) Provisional application No. 62/909,434, filed on Oct. 2, 2019, provisional application No. 62/909,427, filed on Oct. 2, 2019.

(51) Int. Cl.
*H04W 56/00* (2009.01)
*H04W 72/04* (2023.01)
*H04W 72/0446* (2023.01)
*H04W 72/1268* (2023.01)

(52) U.S. Cl.
CPC ....... *H04W 56/005* (2013.01); *H04W 72/042* (2013.01); *H04W 72/0446* (2013.01); *H04W 72/1268* (2013.01); *H04W 56/004* (2013.01)

(58) Field of Classification Search
CPC ..... H04B 7/1851; H04L 5/001; H04L 5/0023; H04L 5/0048; H04L 5/0064; H04L 5/0087; H04L 5/0092; H04L 5/0098; H04L 5/1469; H04W 56/0045; H04W 56/005; H04W 72/042; H04W 72/0446; H04W 72/1268
See application file for complete search history.

(56) References Cited

U.S. PATENT DOCUMENTS

| | | | |
|---|---|---|---|
| 2017/0273056 A1* | 9/2017 | Papasakellariou | H04W 72/042 |
| 2018/0019843 A1* | 1/2018 | Papasakellariou | H04L 5/0048 |
| 2019/0313383 A1* | 10/2019 | Xiong | H04W 16/14 |
| 2019/0349904 A1* | 11/2019 | Kwak | H04L 69/324 |
| 2019/0363843 A1* | 11/2019 | Gordaychik | H04W 52/58 |
| 2020/0028659 A1* | 1/2020 | Huang | H04W 72/0446 |
| 2020/0214008 A1* | 7/2020 | Jo | H04W 72/0446 |
| 2020/0337044 A1* | 10/2020 | Lee | H04W 74/02 |
| 2020/0383147 A1* | 12/2020 | Yoon | H04L 27/2607 |
| 2021/0037484 A1* | 2/2021 | Zhou | H04L 1/1854 |
| 2021/0212101 A1* | 7/2021 | Jiang | H04L 5/001 |

(Continued)

FOREIGN PATENT DOCUMENTS

| | | | | |
|---|---|---|---|---|
| EP | 2706692 A2 | 3/2014 | | |
| EP | 3598685 A1 | 1/2020 | | |
| WO | WO-2018074071 A1 * | 4/2018 | ............ | H03M 13/27 |

OTHER PUBLICATIONS

Corresponding European Patent Application No. 20198872.2, Extended European Search Report dated Feb. 16, 2021.

(Continued)

*Primary Examiner* — Shah M Rahman
(74) *Attorney, Agent, or Firm* — Cooper Legal Group LLC

(57) ABSTRACT

A method and apparatus are disclosed. In an example from the perspective of a User Equipment (UE), the UE receives a Downlink Control Information (DCI) format from a base station. The UE applies a timing offset to information indicated by the DCI format.

17 Claims, 15 Drawing Sheets

(56) References Cited

U.S. PATENT DOCUMENTS

| | | | |
|---|---|---|---|
| 2021/0307016 A1* | 9/2021 | Takeda | H04L 5/16 |
| 2021/0314955 A1* | 10/2021 | Zhang | H04W 72/0493 |
| 2021/0321353 A1* | 10/2021 | Muruganathan | H04L 1/1819 |
| 2021/0385829 A1* | 12/2021 | Reial | H04W 72/1263 |
| 2022/0053442 A1* | 2/2022 | Luo | H04W 72/044 |
| 2022/0159732 A1* | 5/2022 | You | H04W 74/0833 |
| 2022/0191939 A1* | 6/2022 | Christoffersson | H04W 56/0045 |
| 2022/0217774 A1* | 7/2022 | Kim | H04L 5/0007 |
| 2022/0239417 A1* | 7/2022 | Cheng | H04L 1/1896 |

OTHER PUBLICATIONS

Intel Corporation, "Discussion on TA and PRACH for NTN", 3GPP TSG RAN WG1 #98, R1-1908643, Agenda Item 7.2.5.3, Document for Discussion and Decision, Aug. 26-30, 2019, Prague, Czech Republic.

"Physical Layer Procedures for Control", 3GPP TS 38.213, version 15.7.0, Release 15, Sep. 2019.

Fraunhofer IIS, Fraunhofer HHI, NTN NR impacts on the HARQ Operation, 3GPP TSG RAN1 Working Group Meeting RAN1#92, R1-1802613, Document for Discussion, Agenda Item 7.3; 7.3.2 (RAN SI: FS_NR_nonterr_nw), Rel-15, 38.811, Athens, Greece, Feb. 26-Mar. 2, 2018.

* cited by examiner

METHOD AND APPARATUS FOR LARGE PROPAGATION DELAY IN A WIRELESS COMMUNICATION SYSTEM

CROSS-REFERENCE TO RELATED APPLICATIONS

The present Application claims the benefit of U.S. Provisional Patent Application Ser. No. 62/909,434 filed on Oct. 2, 2019, the entire disclosure of which is incorporated herein in its entirety by reference. The present Application also claims the benefit of U.S. Provisional Patent Application Ser. No. 62/909,427 filed on Oct. 2, 2019, the entire disclosure of which is incorporated herein in its entirety by reference.

FIELD

This disclosure generally relates to wireless communication networks, and more particularly, to a method and apparatus for large propagation delay in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives a Downlink Control Information (DCI) format from a base station. The UE applies a timing offset to information indicated by the DCI format.

In an example from the perspective of a UE, the UE receives a DCI format from a base station, wherein the DCI format is indicative of slot formats. The UE does not apply the slot formats for uplink (UL) transmission. The UE does not apply the slot formats for UL slots.

In an example from the perspective of a base station, the base station determines, based upon a timing advance (TA) value of a UE, whether or not to configure the UE to monitor a DCI format 2_0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.211 V15.6.0, "NR Physical channels and modulations"; 3GPP TR 38.821 V0.7.0, "Solutions for NR to support non-terrestrial networks (NTN) (Release 16)"; 3GPP TS 38.213 V15.6.0, "NR Physical layer procedures for control"; 3GPP TS 38.133 V15.6.0, "NR Requirements for support of radio resource management"; 3GPP TS 38.214 V15.6.0, "NR Physical layer procedures for data"; 3GPP TS 38.331 V15.6.0, "NR RRC specification". The standards and documents listed above are hereby expressly incorporated by reference in their entirety.

Figure 1:
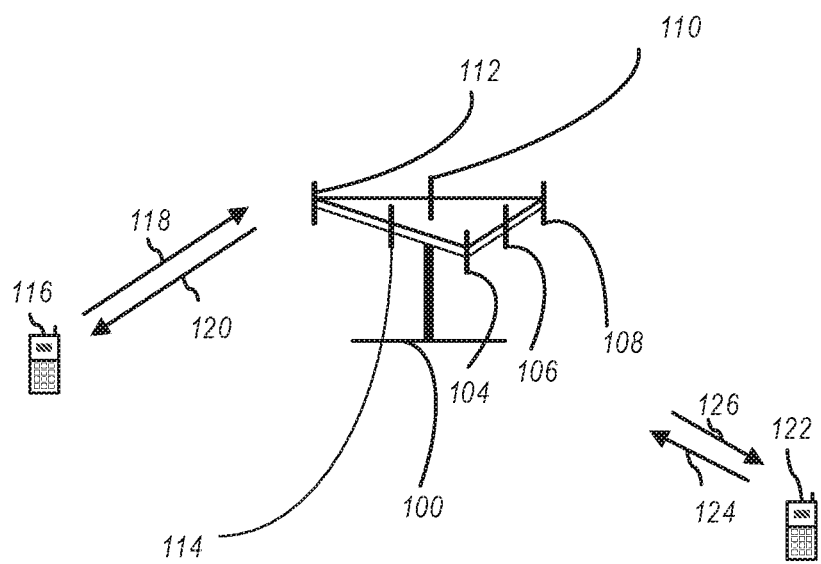
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
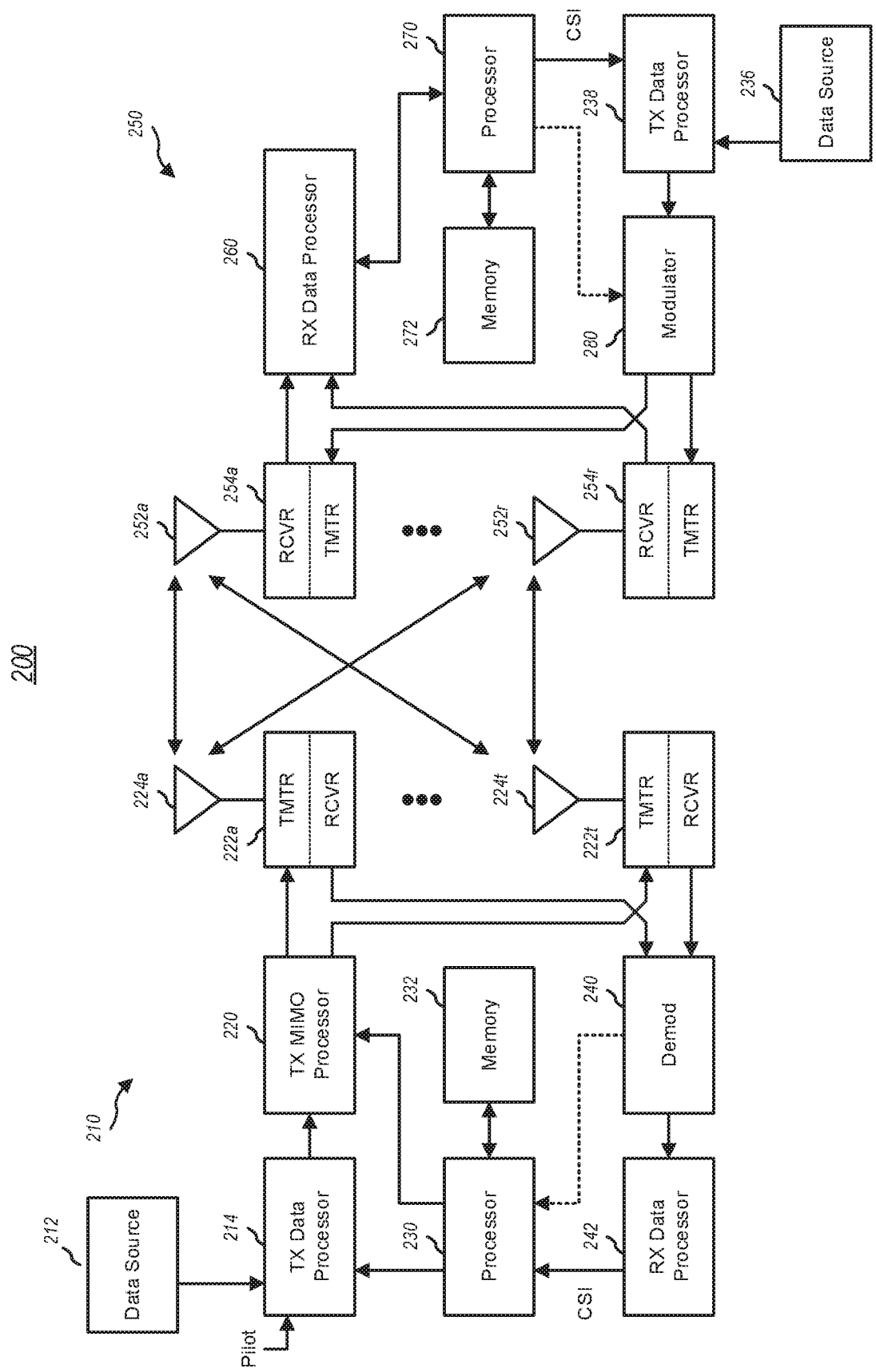
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
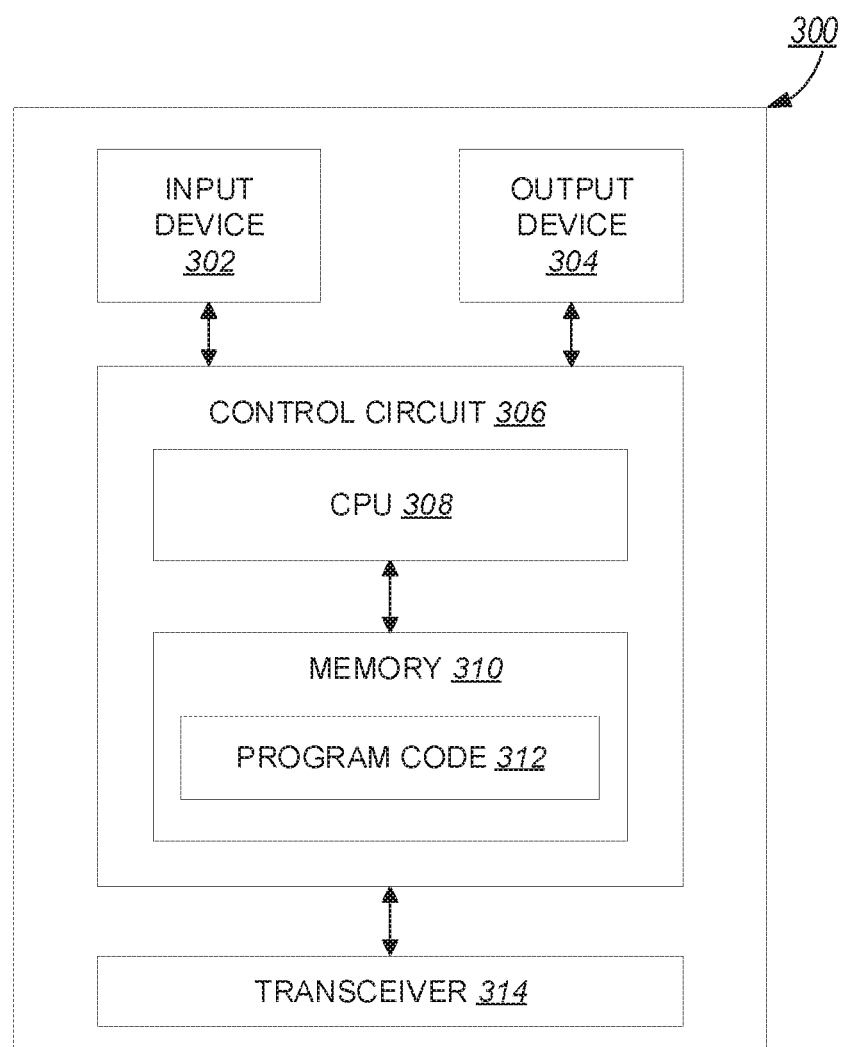
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
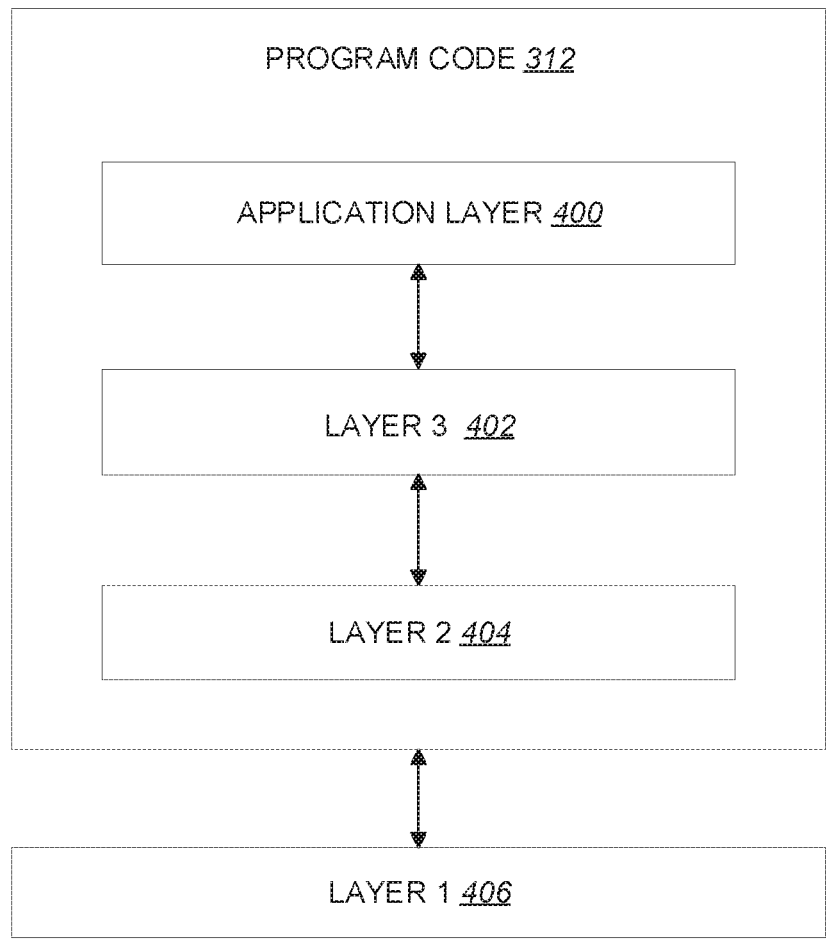
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Figure 5:
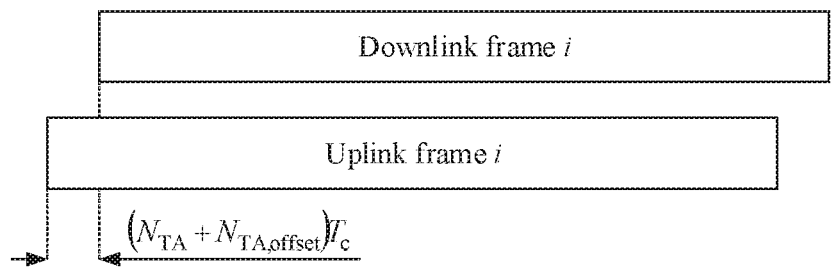
FIG. 5 is a diagram illustrating an exemplary scenario associated with uplink-downlink timing relation according to one exemplary embodiment.

3GPP TS 38.211 V15.6.0 provides details of NR frame structure, channel and numerology design. Parts of 3GPP TS 38.211 V15.6.0 are quoted below. Notably, FIG. 4.3.1-1 of Section 4.3.1 of 3GPP TS 38.211 V15.6.0, entitled "Uplink-downlink timing relation", is reproduced herein as FIG. 5.

4 Frame Structure and Physical Resources
4
4.3 Frame Structure
4.3.1 Frames and Subframes Downlink and uplink transmissions are organized into frames with $T_f=(\Delta f_{max} N_f/100) \cdot T_c = 10$ ms duration, each consisting of ten subframes of $T_{sf}=(\Delta f_{max} N_f/1000) \cdot T_c = 1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier. Uplink frame number i for transmission from the UE shall start $T_{TA}=(N_{TA} \pm N_{TA,offset}) T_c$ before the start of the corresponding downlink frame at the UE where $N_{TA,offset}$ is given by [5, TS 38.213].

FIG. 4.3.1-1: Uplink-Downlink Timing Relation 4.3.2 Slots

For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

Satellite communication, associated with non-terrestrial network (NTN), has drawn attention as a candidate for providing mobile services. At least for areas where convention base stations are not deployed, e.g., at least one of polar areas, desert regions, mountains, airplanes, etc., NTN may be utilized to provide mobile services. Even in areas with convention base station coverage, NTN may potentially be used as a complementary service provider, e.g., for various types of services. High altitude platform station (HAPS), such as drones, unmanned aircrafts, and/or balloons, may be considered as a category or type of NTN, e.g., with a smaller distance from earth than other types of NTN. There are several types of NTN platform under consideration, as shown in the following table from 3GPP TR 38.821 V0.7.0:

TABLE 4.1-1

Types of NTN platforms

| Platforms | Altitude range | Orbit | Typical beam footprint size |
|---|---|---|---|
| Low-Earth Orbit (LEO) satellite | 300-1500 km | Circular around the earth | 100-500 km |
| Medium-Earth Orbit (MEO) satellite | 7000-25000 km | | 100-500 km |
| Geostationary Earth Orbit (GEO) satellite | 35 786 km | notional station keeping position fixed in terms of elevation/azimuth with respect to a given earth point | 200-1000 km |
| UAS platform (including HAPS) | 8-50 km (20 km for HAPS) | | 5-200 km |
| High Elliptical Orbit (HEO) satellite | 400-50000 km | Elliptical around the earth | 200-1000 km |

Note:
UAS stands for "unmanned aircraft system".

Different types of platforms may have different characteristics and/or may be applicable to different scenarios. For example, at least one of the altitude, shape of orbit, mobility, etc. with respect to an earth point may be different for different types of platforms. For GEO, the altitude is higher than at least some other types of platforms, which can result in higher pathloss as well as higher propagation delay and/or higher round-trip delay. GEO may enjoy the benefit of being stationary with respect to an earth point, and may provide coverage for many (and/or most) places around the earth. For LEO, the altitude is relatively short and thus, pathloss, propagation delay and/or round-trip delay may be less, such as compared to GEO. LEO may move around the earth with respect to an earth point (e.g., a distance between a LEO satellite and an earth point may change over time), such that LEO can cover (e.g., provide coverage to) areas which are not covered by GEO (and/or for which GEO has difficulty providing coverage to), such as polar areas. However, a speed of movement of LEO may be high enough for the mobility of LEO to create one or more issues (such as satellites covering a certain area changing and/or moving, such as with high speed, to other areas). Accordingly, base stations operating in NTN (such as LEO satellites) are different than base stations with fixed and/or almost fixed locations. Higher roundtrip delay, higher propagation delay and/or higher base station mobility are some major differences of NTNs as compared to other types of mobile networks. Issues that are induced by at least some of the differences need to be solved to make mobile service support via NTN possible.

As can be observed above, NR frame structure provides a flexible framework of slot format to determine a transmission direction of each OFDM symbol (in one or more slots, for example). A slot configuration can be configured and/or carried by system information and/or a UE-specific Radio Resource Control (RRC) message. A UE may be informed (by higher layer configuration) of a set of OFDM symbol(s) to be downlink (DL), a set of OFDM symbol(s) to be flexible, and/or a set of OFDM symbol(s) to be uplink (UL). A configured OFDM symbol type (e.g., DL, UL, flexible) of an OFDM symbol (e.g., an OFDM symbol configured as flexible) may be overridden by a signal. For example, the signal may be a DL assignment indicating one or more resources for DL reception or a UL grant indicating one or more resources for UL transmission on the OFDM symbol, which enables the UE to determine that the OFDM symbol is UL (if the signal is a UL grant, for example) or DL (if the signal is a DL assignment, for example). Alternatively and/or additionally, the signal may be a group common PDCCH, e.g., DCI format 2_0, which indicates one or more slot formats for one or more slots. A slot format indicated for a slot may inform the UE of OFDM symbol types (e.g., downlink, uplink, or flexible) for each OFDM symbol in the slot. The UE may not expect to receive a group common PDCCH indicating "DL" for an OFDM symbol configured as "UL" by higher layer signaling. The UE may not expect to receive a group common PDCCH indicating "UL" for an OFDM symbol configured as "DL" by higher layer signaling. For an OFDM symbol configured as flexible, a group common PDCCH may indicate the OFDM symbol as "DL", "flexible" or "UL". Transmission or reception of a channel or signal may be influenced by a determination of slot format indication/indicator (SFI). More details of operation related to slot format may be found in the following quotation from 3GPP TS 38.213 V15.6.0:

11.1.1 UE Procedure for Determining Slot Format

This subclause applies for a serving cell that is included in a set of serving cells configured to a UE by slotFormatCombToAddModList and slotFormatCombToReleaseList.

If a UE is configured by higher layers with parameter SlotFormatIndicator, the UE is provided a SFI-RNTI by sfi-RNTI and with a payload size of DCI format 2_0 by dci-PayloadSize.

The UE is also provided in one or more serving cells with a configuration for a search space set s and a corresponding CORESET p for monitoring $M_{p,s}^{(L_{SFI})}$ PDCCH candidates for DCI format 2_0 with a CCE aggregation level of $L_{SFI}$ CCEs as described in Subclause 10.1. The $M_{p,s}^{(L_{SFI})}$ PDCCH candidates are the first $M_{p,s}^{(L_{SFI})}$ PDCCH candidates for CCE aggregation level $L_{SFI}$ for search space set s in CORESET p.

For each serving cell in the set of serving cells, the UE can be provided:
 an identity of the serving cell by servingCellId
 a location of a SFI-index field in DCI format 2_0 by positionInDCI
 a set of slot format combinations by slotFormatCombinations, where each slot format combination in the set of slot format combinations includes
  one or more slot formats indicated by a respective slotFormats for the slot format combination, and
  a mapping for the slot format combination provided by slotFormats to a corresponding SFI-index field value in DCI format 2_0 provided by slotFormatCombinationId
 for unpaired spectrum operation, a reference SCS configuration $u_{SFI}$ by subcarrierSpacing and, when a supplementary UL carrier is configured for the serving cell, a reference SCS configuration $\mu_{SFI,SUL}$ by subcarrierSpacing2 for the supplementary UL carrier
 for paired spectrum operation, a reference SCS configuration $\mu_{SFI,DL}$ for a DL BWP by subcarrierSpacing and a reference SCS configuration $\mu_{SFI,UL}$ for an UL BWP by subcarrierSpacing2

A SFI-index field value in a DCI format 2_0 indicates to a UE a slot format for each slot in a number of slots for each DL BWP or each UL BWP starting from a slot where the UE detects the DCI format 2_0.

The number of slots is equal to or larger than a PDCCH monitoring periodicity for DCI format 2_0. The SFI-index field includes $\max\{\lceil\log_2(\text{maxSFIinde x}+1)\rceil,1\}$ bits where maxSFIindex is the maximum value of the values provided by corresponding slotFormatCombinationId. A slot format is identified by a corresponding format index as provided in Table 11.1.1-1 where 'D' denotes a downlink symbol, 'U' denotes an uplink symbol, and 'F' denotes a flexible symbol.

TABLE 11.1.1-1

Slot formats for normal cyclic prefix

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |

For unpaired spectrum operation for a UE on a serving cell, the UE is provided by subcarrierSpacing a reference SCS configuration $\mu_{SFI}$ for each slot format in a combination of slot formats indicated by a SFI-index field value in DCI format 2_0. The UE expects that for a reference SCS configuration $\mu_{SFI}$ and for an active DL BWP or an active UL BWP with SCS configuration $\mu$, it is $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP or the active UL BWP where the first slot starts at a same time as a first slot for the reference SCS configuration $\mu_{SFI}$ and each downlink or flexible or uplink symbol for the reference SCS configuration $\mu_{SFI}$ corresponds to $2^{(\mu-\mu_{SFI})}$ consecutive downlink or flexible or uplink symbols for the SCS configuration $\mu$.

For paired spectrum operation for a UE on a serving cell, the SFI-index field in DCI format 2_0 indicates a combination of slot formats that includes a combination of slot formats for a reference DL BWP and a combination of slot formats for a reference UL BWP of the serving cell. The UE is provided by subcarrierSpacing a reference SCS configuration $\mu_{SFI,DL}$ for the combination of slot formats indicated by the SFI-index field value in DCI format 2_0 for the reference DL BWP of the serving cell. The UE is provided by subcarrierSpacing2 a reference SCS configuration $\mu_{SFI,UL}$ for the combination of slot formats indicated by the SFI-index field value in DCI format 2_0 for the reference UL BWP of the serving cell. If $\mu_{SFI,DL} \geq \mu_{SFI,UL}$ and for each $2^{(\mu_{SFI,DL}-\mu_{SFI,UL})}+1$ values provided by a value of slotFormats, where the value of slotFormats is determined by a value of slotFormatCombinationId in slotFormatCombination and the value of slotFormatCombinationId is set by the value of the SFI-index field value in DCI format 2_0, the first $2^{(\mu_{SFI,DL}-\mu_{SFI,UL})}$ values for the combination of slot formats are applicable to the reference DL BWP and the next value is applicable to the reference UL BWP. If $\mu_{SFI,DL} < \mu_{SFI,UL}$ and for each $2^{(\mu_{SFL,UL}-\mu_{SFL,DL})}+1$ values provided by slotFormats, the first value for the combination of slot formats is applicable to the reference DL BWP and the next $2^{(\mu_{SFL,UL}-\mu_{SFL,DL})}$ values are applicable to the reference UL BWP.

For unpaired spectrum operation with a second UL carrier for a UE on a serving cell, the SFI-index field value in DCI format 2_0 indicates a combination of slot formats that includes a combination of slot formats for a reference first UL carrier of the serving cell and a combination of slot formats for a reference second UL carrier of the serving cell. The UE is provided by subcarrierSpacing a reference SCS configuration $\mu_{SFI}$ for the combination of slot formats indicated by the SFI-index field in DCI format 2_0 for the reference first UL carrier of the serving cell. The UE is provided by subcarrierSpacing2 a reference SCS configuration $\mu_{SFI,SUL}$ for the combination of slot formats indicated by the SFI-index field value in DCI format 2_0 for the reference second UL carrier of the serving cell. For each $2^{(\mu_{SFI}-\mu_{SFI,SUL})}+1$ values of slotFormats, the first values for the combination of slot formats are applicable to the reference first UL carrier and the next value is applicable to the reference second UL carrier.

For a set of symbols of a slot, a UE does not expect to detect a DCI format 2_0 with an SFI-index field value indicating the set of symbols of the slot as uplink and to detect a DCI format 1_0, a DCI format 1_1, or DCI format 0_1 indicating to the UE to receive PDSCH or CSI-RS in the set of symbols of the slot.

For a set of symbols of a slot, a UE does not expect to detect a DCI format 2_0 with an SFI-index field value indicating the set of symbols in the slot as downlink and to detect a DCI format 0_0, DCI format 0_1, DCI format 1_0, DCI format 1_1, DCI format 2_3, or a RAR UL grant indicating to the UE to transmit PUSCH, PUCCH, PRACH, or SRS in the set of symbols of the slot.

For a set of symbols of a slot that are indicated as downlink/uplink by tdd-UL-DL-ConfigurationCommon, or tdd-UL-DL-ConfigurationDedicated, the UE does not expect to detect a DCI format 2_0 with an SFI-index field value indicating the set of symbols of the slot as uplink/downlink, respectively, or as flexible.

For a set of symbols of a slot indicated to a UE by ssb-PositionsInBurst in SIB1 or ssb-PositionsInBurst in ServingCellConfigCommon for reception of SS/PBCH blocks, the UE does not expect to detect a DCI format 2_0 with an SFI-index field value indicating the set of symbols of the slot as uplink.

For a set of symbols of a slot indicated to a UE by prach-ConfigurationIndex in RACH-ConfigCommon for PRACH transmissions, the UE does not expect to detect a DCI format 2_0 with an SFI-index field value indicating the set of symbols of the slot as downlink.

For a set of symbols of a slot indicated to a UE by pdcch-ConfigSIB1 in MIB for a CORESET for Type0-PDCCH CSS set, the UE does not expect to detect a DCI format 2_0 with an SFI-index field value indicating the set of symbols of the slot as uplink.

For a set of symbols of a slot indicated to a UE as flexible by tdd-UL-DL-ConfigurationCommon and tdd-UL-DL-ConfigurationDedicated, or when tdd-UL-DL-ConfigurationCommon and tdd-UL-DL-ConfigurationDedicated are not provided to the UE, and if the UE detects a DCI format 2_0 providing a format for the slot using a slot format value other than 255 if one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols if an SFI-index field value in DCI format 2_0 indicates the set of symbols of the slot as flexible and the UE detects a DCI format 1_0, DCI format 1_1, or DCI format 0_1 indicating to the UE to receive PDSCH or CSI-RS in the set of symbols of the slot, the UE receives PDSCH or CSI-RS in the set of symbols of the slot if an SFI-index field value in DCI format 2_0 indicates the set of symbols of the slot as flexible and the UE detects a DCI format 0_0, DCI format 0_1, DCI format 1_0, DCI format 1_1, DCI format 2_3, or a RAR UL grant indicating to the UE to transmit PUSCH, PUCCH, PRACH, or SRS in the set of symbols of the slot the UE transmits the PUSCH, PUCCH, PRACH, or SRS in the set of symbols of the slot if an SFI-index field value in DCI format 2_0 indicates the set of symbols of the slot as flexible, and the UE does not detect a DCI format 1_0, DCI format 1_1, or DCI format 0_1 indicating to the UE to receive PDSCH or CSI-RS, or the UE does not detect a DCI format 0_0, DCI format 0_1, DCI format 1_0, DCI format 1_1, DCI format 2_3, or a RAR UL grant indicating to the UE to transmit PUSCH, PUCCH, PRACH, or SRS in the set of symbols of the slot, the UE does not transmit or receive in the set of symbols of the slot if the UE is configured by higher layers to receive PDSCH or CSI-RS in the set of symbols of the slot, the UE receives the PDSCH or the CSI-RS in the set of symbols of the slot only if an SFI-index field value in DCI format 2_0 indicates the set of symbols of the slot as downlink if the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink if the UE is configured by higher layers to transmit SRS in the set of symbols of the slot, the UE transmits the SRS only in a subset of symbols from the set of symbols of the slot indicated as uplink symbols by an SFI-index field value in DCI format 2_0 a UE does not expect to detect an SFI-index field value in DCI format 2_0 indicating the set of symbols of the slot as downlink and also detect a DCI format 0_0, DCI format 0_1, DCI format 1_0, DCI format 1_1, DCI format 2_3, or a RAR UL grant indicating to the UE to transmit SRS, PUSCH, PUCCH, or PRACH, in one or more symbols from the set of symbols of the slot a UE does not expect to detect an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH as described in Subclause 10.2 a UE does not expect to detect an SFI-index field value in DCI format 2_0 indicating the set of symbols of the slot as uplink and also detect a DCI format 1_0 or DCI format 1_1 or DCI format 0_1 indicating to the UE to receive PDSCH or CSI-RS in one or more symbols from the set of symbols of the slot If a UE is configured by higher layers to receive a CSI-RS or a PDSCH in a set of symbols of a slot and the UE detects a DCI format 2_0 with a slot format value other than 255 that indicates a slot format with a subset of symbols from the set of symbols as uplink or flexible, or the UE detects a DCI format 0_0, DCI format 0_1, DCI format 1_0, DCI format 1_1, or DCI format 2_3 indicating to the UE to transmit PUSCH, PUCCH, SRS, or PRACH in at least one symbol in the set of the symbols, the UE cancels the CSI-RS reception in the set of symbols of the slot or cancels the PDSCH reception in the slot.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format 1_0, DCI format 1_1, or DCI format 0_1 indicating to the UE to receive CSI-RS or PDSCH in a subset of symbols from the set of symbols, then the UE does not expect to cancel the transmission in symbols from the subset of symbols that occur, relative to a last symbol of a CORESET where the UE detects the DCI format 2_0 or the DCI format 1_0 or the DCI format 1_1 or the DCI format 0_1, after a number of symbols that is smaller than the PUSCH preparation time $T_{proc,2}$ for the corresponding PUSCH processing capability [6, TS 38.214]

the UE cancels the PUCCH, or PUSCH, or PRACH transmission in remaining symbols from the set of symbols and cancels the SRS transmission in remaining symbols from the subset of symbols.

A PUSCH preparation time throughout Subclause 11.1.1 is as described in [6, TS 38.214].

A UE assumes that flexible symbols in a CORESET configured to the UE for PDCCH monitoring are downlink symbols if the UE does not detect an SFI-index field value in DCI format 2_0 indicating the set of symbols of the slot as flexible or uplink and the UE does not detect a DCI format 0_0, DCI format 0_1, DCI format 1_0, DCI format 1_1, or DCI format 2_3 indicating to the UE to transmit SRS, PUSCH, PUCCH, or PRACH in the set of symbols.

For a set of symbols of a slot that are indicated as flexible by tdd-UL-DL-ConfigurationCommon, and tdd-UL-DL-ConfigurationDedicated, or when tdd-UL-DL-ConfigurationCommon, and tdd-UL-DL-ConfigurationDedicated are not provided to the UE, and if the UE does not detect a DCI format 2_0 providing a slot format for the slot the UE receives PDSCH or CSI-RS in the set of symbols of the slot if the UE receives a corresponding indication by a DCI format 1_0, DCI format 1_1, or DCI format 0_1 the UE transmits PUSCH, PUCCH, PRACH, or SRS in the set of symbols of the slot if the UE receives a corresponding indication by a DCI format 0_0, DCI format 0_1, DCI format 1_0, DCI format 1_1, or DCI format 2_3 the UE receives PDCCH as described in Subclause 10.1 if the UE is configured by higher layers to receive PDSCH or CSI-RS in the set of symbols of the slot, the UE does not receive the PDSCH or the CSI-RS in the set of symbols of the slot if the UE is configured by higher layers to transmit SRS, or PUCCH, or PUSCH, or PRACH in the set of symbols of the slot, the UE does not transmit the PUCCH, or the PUSCH, or the PRACH in the slot and does not transmit the SRS in symbols from the set of symbols in the slot, if any, starting from a symbol that is a number of symbols equal to the PUSCH preparation time $N_2$ for the corresponding PUSCH timing capability after a last symbol of a CORESET where the UE is configured to monitor PDCCH for DCI format 2_0 does not expect to cancel the transmission of the SRS, or the PUCCH, or the PUSCH, or the PRACH in symbols from the set of symbols in the slot, if any, starting before a symbol that is a number of symbols equal to the PUSCH preparation time $N_2$ for the corresponding PUSCH timing capability after a last symbol of a CORESET where the UE is configured to monitor PDCCH for DCI format 2_0

Timing advance (TA) is used to achieve UL synchronization. Since UEs may be in different places within coverage of a base station, different propagation delays may result in different arrival times of UL signals from different UEs, e.g., UEs in different locations (e.g., a propagation delay may correspond to a duration of time between transmission of a signal by a UE and reception of the signal by a base station and/or a duration of time between transmission of a signal by a base station and reception of the signal by a UE). UL signals with un-aligned arrival times may cause interference with each other in the receiver side, e.g., base station side. To solve the issue, a UE may adjust its UL transmission timing (e.g., UL frame boundary) to be ahead of its DL reception timing (e.g., DL frame boundary) with a proper time amount. The time amount may, for example, be used to align a timing difference between UL and DL at the base station side. The time amount is a timing advance (TA). TA may be obtained via a random access procedure. TA design is reflected in the frame structure quoted above (e.g., shown in FIG. 5), where a UL frame boundary and a DL frame boundary are separated by a TA value (as well as an offset value, for example, which may be used to accommodate hardware switch for unpaired spectrum). A UE transmits a preamble to a base station (e.g., a preamble with zero TA and/or with a small offset). Design of preamble signal and/or sequence would enable the base station to estimate a propagation delay and/or a round trip delay between the UE and the base station, and/or to derive a TA value (e.g., a proper TA value) for the UE. The TA value would then be signaled to the UE in a Random Access Response (RAR). The UE may apply the TA value for one or more UL transmissions (e.g., UL transmissions associated with one or more types of channels and/or signals, such as at least one of PUSCH, PUCCH, SRS, etc.). Since the UE may move (e.g., the location of the UE may change) and/or a channel used by the UE may change (such as due to blocking and/or a new path), the TA value may need to be updated. The base station may estimate a UL transmission and/or a reference signal from the UE to adjust, modify and/or fine-tune the TA value, such as by sending a MAC control element carrying an adjustment value for TA. A random access procedure may be triggered if a TA value loses its track and/or becomes inaccurate. More details regarding TA related operation may be found in the following quotation from 3GPP TS 38.213 V15.6.0:

4.2 Transmission Timing Adjustments

In case of random access response, a timing advance command [11, TS 38.321], $T_A$, for a TAG indicates $N_{TA}$ values by index values of $T_A$=0, 1, 2, . . . , 3846, where an amount of the time alignment for the TAG with SCS of $2^\mu \cdot 15$ kHz is $N_{TA}=T_A \cdot 16 \cdot 64/2^\mu$. $N_{TA}$ is defined in [4, TS 38.211] and is relative to the SCS of the first uplink transmission from the UE after the reception of the random access response.

In other cases, a timing advance command [11, TS 38.321], $T_A$, for a TAG indicates adjustment of a current $N_{TA}$ value, $N_{TA\_old}$, to the new $N_{TA}$ value, $N_{TA\_new}$, by index values of $T_A$=0, 1, 2, . . . , 63, where for a SCS of $2^\mu \cdot 15$ kHz, $N_{TA\_new}=N_{TA\_old}+(T_A-31) \cdot 16 \cdot 64/2^\mu$.

Bandwidth part (BWP) is introduced in 5G to support a wider range of possible bandwidths. Such bandwidth adaptation may also benefit power consumption. With proper setting of BWP, a UE may operate in smaller bandwidth which targets minimized power consumption when there is no or little traffic, and/or the UE may operate in larger bandwidth which targets higher data rate when there is more than a threshold amount of ongoing traffic. BWP adaptation also provides a framework to change numerology (e.g., subcarrier spacing). A base station may send a DCI to switch from a first BWP to a second BWP. This DCI is also known as BWP switch command. There would be a delay for switching from a first BWP to a second BWP. The delay is due to adaptation of a transmission/reception bandwidth and/or a center frequency for transmission or reception. The delay may be determined by a scheduling delay indicated by a DCI indicating BWP switch. A base station should set the scheduling delay properly (e.g., sufficient longer) to accommodate a required delay for the BWP switch. Information related to BWP operation may be found in the following quotation from 3GPP TS 38.213 V15.6.0:

12 Bandwidth Part Operation

For each DL BWP or UL BWP in a set of DL BWPs or UL BWPs, respectively, the UE is provided the following parameters for the serving cell as defined in [4, TS 38.211] or [6, TS 38.214]:

- a SCS by subcarrierSpacing
- a cyclic prefix by cyclicPrefix
- a common RB $N_{BWP}^{start}=O_{carrier}+RB_{start}$ and a number of contiguous RBs $N_{BWP}^{size}=L_{RB}$ provided by locationAndBandwidth that indicates an offset $RB_{start}$ and a length $L_{RB}$ as RIV according to [6, TS 38.214], setting $N_{BWP}^{size}=275$, and a value $O_{carrier}$ provided by offsetToCarrier for the subcarrierSpacing
- an index in the set of DL BWPs or UL BWPs by respective BWP-Id
- a set of BWP-common and a set of BWP-dedicated parameters by BWP-DownlinkCommon and BWP-DownlinkDedicated for the DL BWP, or BWP-UplinkCommon and BWP-UplinkDedicated for the UL BWP [12, TS 38.331]

For unpaired spectrum operation, a DL BWP from the set of configured DL BWPs with index provided by BWP-Id is linked with an UL BWP from the set of configured UL BWPs with index provided by BWP-Id when the DL BWP index and the UL BWP index are same.

If a bandwidth part indicator field is configured in DCI format 1_1, the bandwidth part indicator field value indicates the active DL BWP, from the configured DL BWP set, for DL receptions as described in [5, TS 38.212]. If a bandwidth part indicator field is configured in DCI format 0_1, the bandwidth part indicator field value indicates the active UL BWP, from the configured UL BWP set, for UL transmissions as described in [5, TS 38.212].

A UE does not expect to detect a DCI format 1_1 or a DCI format 0_1 indicating respectively an active DL BWP or an active UL BWP change with the corresponding time domain resource assignment field providing a slot offset value for a PDSCH reception or PUSCH transmission that is smaller than a delay required by the UE for an active DL BWP change or UL BWP change [10, TS 38.133].

If a UE detects a DCI format 1_1 indicating an active DL BWP change for a cell, the UE is not required to receive or transmit in the cell during a time duration from the end of the third symbol of a slot where the UE receives the PDCCH that includes the DCI format 1_1 in a scheduling cell until the beginning of a slot indicated by the slot offset value of the time domain resource assignment field in the DCI format 1_1.

If a UE detects a DCI format 0_1 indicating an active UL BWP change for a cell, the UE is not required to receive or transmit in the cell during a time duration from the end of the third symbol of a slot where the UE receives the PDCCH that includes the DCI format 0_1 in the scheduling cell until the beginning of a slot indicated by the slot offset value of the time domain resource assignment field in the DCI format 0_1.

A UE does not expect to detect a DCI format 1_1 indicating an active DL BWP change or a DCI format 0_1 indicating an active UL BWP change for a scheduled cell within FR1 (or FR2) in a slot other than the first slot of a set of slots for the DL SCS of the scheduling cell that overlaps with a time duration where the UE is not required to receive or transmit for an active BWP change in a different cell from the scheduled cell within FR1 (or FR2).

Information related to BWP switch delay may be found in the following quotation from 3GPP TS 38.133 V15.6.0:

8.6 Active BWP Switch Delay 8.6.2 DCI and Timer Based BWP Switch Delay

For DCI-based BWP switch, after the UE receives BWP switching request at DL slot n on a serving cell, UE shall be able to receive PDSCH (for DL active BWP switch) or transmit PUSCH (for UL active BWP switch) on the new BWP on the serving cell on which BWP switch on the first DL or UL slot occurs right after the beginning of DL slot $n+T_{BWPswitchDelay}$.

The UE is not required to transmit UL signals or receive DL signals during time duration $T_{BWPswitchDelay}$ on the cell where DCI-based BWP switch occurs. The UE is not required to follow the requirements defined in this section when performing a DCI-based BWP switch between the BWPs in disjoint channel bandwidths or in partially overlapping channel bandwidths.

Depending on UE capability bwp-SwitchingDelay [2], UE shall finish BWP switch within the time duration $T_{BWPswitchDelay}$ defined in Table 8.6.2-1.

TABLE 8.6.2-1

BWP switch delay

| μ | NR Slot length (ms) | BWP switch delay $T_{BWPswitchDelay}$ (slots) | |
| --- | --- | --- | --- |
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1
Depends on UE capability.

Note 2:
If the BWP switch involves changing of SCS, the BWP switch delay is determined by the larger one between the SCS before BWP switch and the SCS after BWP switch.

Information related to resource allocation may be found in the following quotation from 3GPP TS 38.214 V15.6.0:
6.1.2.1 Resource Allocation in Time Domain When the UE is scheduled to transmit a transport block and no CSI report, or the UE is scheduled to transmit a transport block and a CSI report(s) on PUSCH by a DCI, the Time domain resource assignment field value m of the DCI provides a row index m+1 to an allocated table. The determination of the used resource allocation table is defined in sub-clause 6.1.2.1.1. The indexed row defines the slot offset $K_2$, the start and length indicator SLIV, or directly the start symbol S and the allocation length L, and the PUSCH mapping type to be applied in the PUSCH transmission.

The slot where the UE shall transmit the PUSCH is determined by $K_2$ as $$\left\lfloor n \cdot \frac{2^{\mu_{PUSCH}}}{2^{\mu_{PDCCH}}} \right\rfloor + K_2$$

where n is the slot with the scheduling DCI, $K_2$ is based on the numerology of PUSCH, and $\mu_{PUSCH}$ and $\mu_{PDCCH}$ are the subcarrier spacing configurations for PUSCH and PDCCH, respectively, and Information related to PUSCH-TimeDomainResourceAllocationList may be found in the following quotation from 3GPP TS 38.331 V15.6.0:

---
PUSCH-TimeDomainResourceAllocation information element
---
-- ASN1START
-- TAG-PUSCH-TIMEDOMAINRESOURCEALLOCATIONLIST-START
PUSCH-TimeDomainResourceAllocationList : : = SEQUENCE
(SIZE (1 . . maxNrofUL-Allocations)) OF PUSCH-TimeDomainResourceAllocation
PUSCH-TimeDomainResourceAllocation : : =   SEQUENCE {
  k2                                INTEGER (0 . . 32)
OPTIONAL,    -- Need S
  mappingType                       ENUMERATED {typeA, typeB},
  startSymbolAndLength              INTEGER (0 . . 127)
}
-- TAG-PUSCH-TIMEDOMAINRESOURCEALLOCATIONLIST-STOP
-- ASN1STOP ---
PUSCH-TimeDomainResourceAllocationList field descriptions
---
k2
Corresponds to L1 parameter 'K2' (see TS 38.214 [19], clause 6.1.2.1) When the field is absent the UE applies the value 1 when PUSCH SCS is 15/30 kHz; the value 2 when PUSCH SCS is 60 kHz, and the value 3 when PUSCH SCS is 120 KHz.

---

In some examples, a base station discussed with respect to embodiments disclosed herein may be (and/or may be positioned on) a satellite. In some examples, a base station discussed with respect to embodiments disclosed herein may be stationary with respect to an earth point. In some examples, a base station discussed with respect to embodiments disclosed herein may move, such as with a high speed (e.g., a speed higher than a threshold speed), with respect to an earth point. In some examples, a UE discussed with respect to embodiments disclosed herein may be on earth. In some examples, a UE discussed with respect to embodiments disclosed herein may be on an airplane (and/or other type of aircraft and/or aerial vehicle).

In some examples, techniques, operations and/or behaviors discussed with respect to embodiments disclosed herein may be applied and/or implemented for NTNs (e.g., techniques, operations and/or behaviors discussed with respect to embodiments disclosed herein may be applied and/or implemented in scenarios in which a UE and/or a base station operate in a NTN). In some examples, techniques, operations and/or behaviors discussed with respect to embodiments disclosed herein may not be applied and/or implemented in scenarios that do not involve NTNs. In some examples, techniques, operations and/or behaviors discussed with respect to embodiments disclosed herein may be applied and/or implemented for scenarios that do not involve NTNs. In some examples, techniques, operations and/or behaviors discussed with respect to embodiments disclosed herein may be applied and/or implemented in scenarios in which a propagation delay (such as between a UE and a base station) is larger than a threshold propagation delay. In some examples, techniques, operations and/or behaviors discussed with respect to embodiments disclosed herein may not be applied and/or implemented in scenarios in which a propagation delay (such as between a UE and a base station) is not larger than a threshold propagation delay. In some examples, techniques, operations and/or behaviors discussed with respect to embodiments disclosed herein may be applied and/or implemented in scenarios in which a propagation delay (such as between a UE and a base station) is not larger than a threshold propagation delay. In some examples, techniques, operations and/or behaviors discussed with respect to embodiments disclosed herein may be applied and/or implemented responsive to a base station indicating to (and/or instructing) a UE to apply and/or implement at least some of the techniques, operations and/or behaviors. In some examples, techniques, operations and/or behaviors discussed with respect to embodiments disclosed herein may not be applied and/or implemented if a base station does not indicate to (and/or instruct) a UE to apply and/or implement at least some of the techniques, operations and/or behaviors. In some examples, techniques, operations and/or behaviors discussed with respect to embodiments disclosed herein may be applied and/or implemented if a base station does not indicate to (and/or instruct) a UE to apply and/or implement at least some of the techniques, operations and/or behaviors. In some examples, when techniques, operations and/or behaviors discussed with respect to embodiments disclosed herein are not applied and/or implemented, other techniques, operations and/or behaviors may be implemented, such as techniques, operations and/or behaviors discussed in quoted segments of the foregoing description, and/or techniques, operations and/or behaviors based upon a 3GPP standard.

Figure 6:
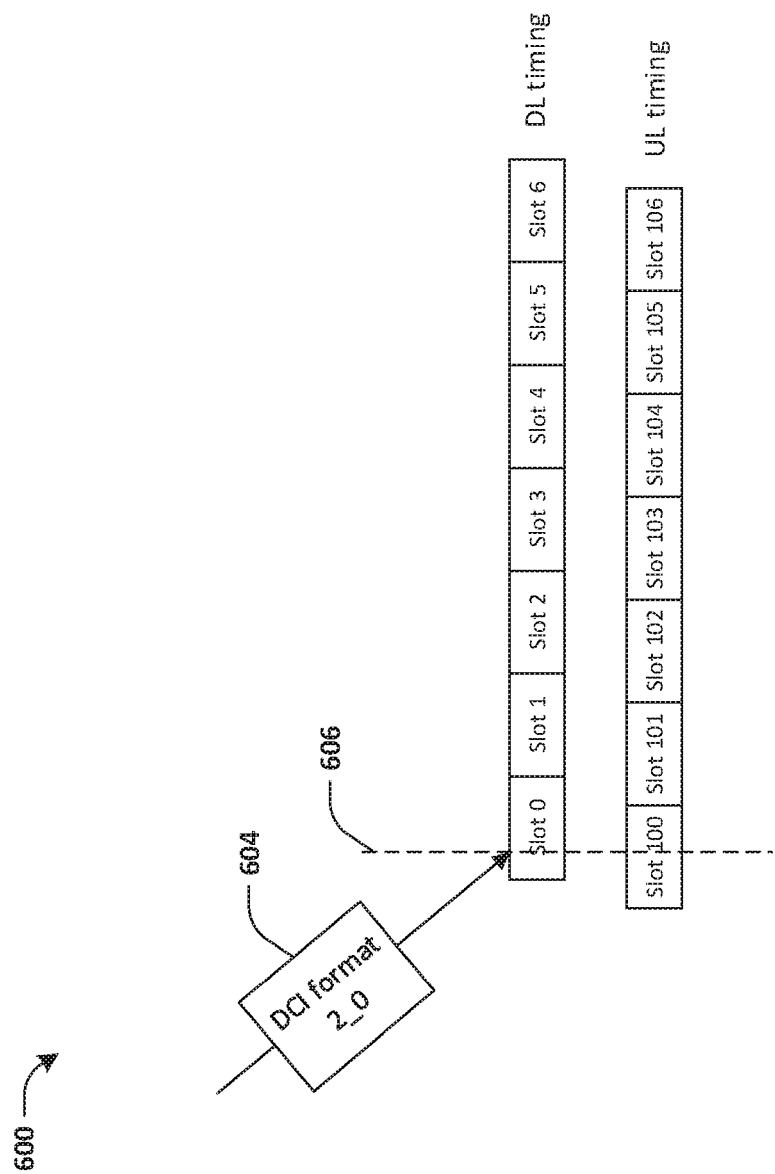
FIG. 6 is a diagram illustrating an exemplary scenario associated with reception of a Downlink Control Information (DCI) format according to one exemplary embodiment.

As shown in quoted segments of the foregoing description and/or other parts of the foregoing description, a Slot Format Indication/Indicator (SFI) may be indicated by a Downlink Control Information (DCI) format 2_0. A slot format combination (e.g., a set of slot formats (such as a sequence of slot formats) for a set of slots), indicated by a DCI format 2_0 may start in a slot in which a UE receives the DCI format 2_0. Alternatively and/or additionally, there may be certain restrictions associated with which symbol(s) (of the slot) the UE can use to receive the DCI format 2_0 (e.g., reception of the DCI format 2_0 may be restricted to one or more symbols of the slot, such as the initial three symbols of the slot). In scenarios involving a NTN and/or a system with a large round-trip delay (e.g., a round-trip delay that is larger than a threshold round-trip delay), a large timing advance (TA) may be used (e.g., a TA that is larger than a threshold TA). For example, a TA value (e.g., a proper TA value) may be 100 milliseconds (ms) for a UE (e.g., a TA value of 100 ms may be used in scenarios involving a NTN and/or a long round-trip delay). For example, an uplink (UL) frame and/or an UL slot may start 100 ms before a downlink (DL) frame and/or a DL slot (if the TA value for the UE is 100 ms). In an example where a subcarrier spacing of 15 kHz and/or a TA value of 100 ms is configured for a UE, the UE receives a DCI format 2_0 in a slot n with respect to DL timing. The slot n with respect to DL timing may correspond to a slot n+100 with respect to UL timing (and/or a different slot number with respect to UL timing if a subcarrier spacing other than 15 kHz is used, such as slot n+200 with respect to UL timing if the subcarrier spacing is 30 kHz, for example). For example, a time that the UE receives the DCI format 2_0 may correspond to the slot n with respect to DL timing and to the slot n+100 with respect to UL timing, such as due to the UE being configured with the TA value of 100 ms and the subcarrier spacing of 15 kHz. In an example where the DCI format 2_0 is indicative of a slot format combination for 20 slots, the DCI format 2_0 (and/or the slot format combination of the DCI format 2_0) may be applicable to DL slots (with respect to DL timing) comprising DL slot n, DL slot n+1, . . . , DL slot n+19 and to UL slots (with respect to UL timing) comprising UL slot n, UL slot n+1, . . . , UL slot n+19 (with respect to UL timing). However, the DCI format 2_0 is received at a time after the UL slots (e.g., the DCI format 2_0 may be received at a time corresponding to UL slot n+100), and thus, the UE may not be able to use the slot format combination, indicated by the DCI format 2_0, for UL. An example of this issue is illustrated in FIG. 6. FIG. 6 illustrates a scenario 600 in which a UE receives a DCI format 2_0 604. The DCI format 2_0 604 may be indicative of slot formats for 20 slots. The 20 slots may correspond to slots 0-19 (e.g., DL slot 0, DL slot 1, . . . , DL slot 19 with respect to DL timing and/or UL slot 0, UL slot 1, . . . , UL slot 19 with respect to UL timing). However, a time 606, at which the DCI format 2_0 604 is received, corresponds to a UL slot 100 with respect to UL timing, and thus, the UE may not be able to use slot formats, indicated by the DCI format 2_0 604, for UL.

In a first general concept of the present disclosure, a timing offset may be applied when interpreting information indicated by a DCI format 2_0. In some embodiments, the timing offset is applied for first information indicated by the DCI format 2_0 and/or the timing offset is not applied for second information indicated by the DCI format 2_0. The first information may correspond to slot formats for UL slots and/or the second information may correspond to slot formats for DL slots. For example, the timing offset may be applied to slot formats, for UL slots, indicated by the DCI format 2_0. Alternatively and/or additionally, the timing offset may not be applied to slot formats, for DL slots, indicated by the DCI format 2_0. For example, if a DCI format 2_0 is received in slot X (e.g., DL slot X), a slot format combination, for UL slots, that is indicated by the DCI format 2_0 may be applied to UL slots starting from UL slot X+Y (where Y may correspond to the timing offset). The slot format combination for UL slots may be applied to UL slot X+Y, UL slot X+Y+1, . . . , UL slot X+Y+Z−1 (where Z may correspond to a number of UL slots for which slot format is indicated by the DCI format 2_0 and/or indicated by the slot format combination for UL slots). A slot format combination, for DL slots, that is indicated by the DCI format 2_0 may be applied to DL slots starting from DL slot X. The slot format combination for DL slots may be applied to DL slot X, DL slot X+1, . . . , DL slot X+W−1 (where W may correspond to a number of DL slots for which slot format is indicated by the DCI format 2_0 and/or indicated by the slot format combination for DL slots). In some embodiments, W is equal to Z. Alternatively and/or additionally, W may be not be equal to Z.

In a second general concept of the present disclosure, an effect of TA may be considered when applying DCI format 2_0 (and/or the DCI format 2_0 may be applied based upon the TA). In some embodiments, when a UE receives a DCI format 2_0 in a DL slot X, the UE applies, based upon the DCI format 2_0, one or more slot formats for DL slots starting from DL slot X. In some embodiments, the UE applies, based upon the DCI format 2_0, one or more slot formats for UL slots starting from UL slot X+Y. The value of Y may be determined based upon a TA value of the UE. In some embodiments, Y is equal to the TA value of the UE. Alternatively and/or additionally, Y may not be equal to the TA value of the UE. In some embodiments, amongst UL slots associated with the UE, the UL slot X+Y may be closest (e.g., in time) to the DL slot X. Alternatively and/or additionally, the UL slot X+Y may overlap (e.g., in time) with the DL slot X. Alternatively and/or additionally, the UL slot X+Y may be after the DL slot X. Alternatively and/or additionally, a time at which the DCI format 2_0 is received may be in the UL slot X+Y. Alternatively and/or additionally, the UL slot X+Y may be the first (e.g., an initial) UL slot after (and/or when) receiving the DCI format 2_0. In some embodiments, there may be quantization on Y, such as to ensure UEs with different TA values apply an UL slot format, indicated in the slot format combination, to a same UL slot. In some embodiments, the quantization may be done with Q slots. In some embodiments, Y is divisible by Q and, amongst UL slots associated with the UE, the UL slot X+Y may be closest (e.g., in time) to the DL slot X. Alternatively and/or additionally, Y may be divisible by Q and the UL slot X+Y may overlap (e.g., in time) with the DL slot X. Alternatively and/or additionally, Y may be divisible by Q and the UL slot X+Y may be after the DL slot X. Alternatively and/or additionally, Y may be divisible by Q and a time at which the DCI format 2_0 is received may be in the UL slot X+Y. Alternatively and/or additionally, Y may be divisible by Q and the UL slot X+Y may be the first (e.g., an initial) UL slot after (and/or when) receiving the DCI format 2_0.

In a third general concept of the present disclosure, one or more slot formats for DL activity may be applied by a UE based upon a DCI format 2_0 received by the UE (e.g., one or more slot formats, that are for one or more DL slots, one or more DL Bandwidth Parts (BWPs) and/or DL reception, may be determined and/or applied based upon the DCI format 2_0) and/or slot formats for UL activity may not be applied based upon the DCI format 2_0 (e.g., one or more slot formats, that are for one or more UL slots, one or more UL BWPs and/or UL transmission, may not be determined and/or applied based upon the DCI format 2_0). The DCI format 2_0 may be indicative of slot format information for UL activity (e.g., the slot format information may be indicative of one or more slot formats that are for one or more UL slots, one or more UL BWPs and/or UL transmission), however, the slot format information for UL activity may not be used and/or applied. For example, the slot format information for UL activity may be ignored and/or skipped. Alternatively and/or additionally, the DCI format 2_0 may not be indicative of slot format information for UL activity (e.g., the DCI format 2_0 may not comprise slot format information for one or more UL slots, one or more UL BWPs and/or for UL transmission). For example, the UE may apply slot formats in a slot format combination (e.g., all slot formats in the slot format combination) that is indicated by the DCI format 2_0 to DL slots (and/or to one or more DL BWPs and/or to DL reception), such as due to the DCI format 2_0 being merely indicative of slot format information for DL activity. In some embodiments, restricting the DCI format 2_0 to not indicate slot formats for UL activity may be applied to paired spectrum. Alternatively and/or additionally, restricting the DCI format 2_0 to not indicate slot formats for UL activity may be applied to unpaired spectrum.

In a fourth general concept of the present disclosure, dynamic slot format indications/indicators (dynamic SFIs) may not be used in one or more cases, such as in a case in which a TA is used by a UE for UL timing and DL timing and/or in which the TA is larger than a threshold TA. In some embodiments, the UE may not monitor DCI format 2_0 in the one or more cases. Alternatively and/or additionally, the UE may not be configured to monitor DCI format 2_0 in the one or more cases. Alternatively and/or additionally, it may be prohibited to configure the UE to monitor DCI format 2_0 in the one or more cases.

Throughout the present disclosure, a BWP may correspond to at least one of a DL BWP; an UL BWP; a DL BWP and an UL BWP; a pair of DL BWPs and an UL BWP; or a pair of BWPs comprising a DL BWP and an UL BWP.

Techniques, operations, behavior, systems and/or apparatuses described throughout the present disclosure can be implemented with a single serving cell, unless otherwise noted.

Techniques, operations, behavior, systems and/or apparatuses described throughout the present disclosure can be implemented with multiple serving cells, unless otherwise noted.

Throughout the present disclosure, a base station can configure multiple BWPs to a UE, unless otherwise noted.

Throughout the present disclosure, a base station can configure a single BWP to a UE, unless otherwise noted.

In a first embodiment, a UE receives a DCI format from a base station. The DCI format is for slot format indication (e.g., the DCI format indicates one or more slot formats). The UE applies a timing offset to first information indicated by the DCI format. In some examples, the DCI format is a DCI format 2_0. The DCI format may not schedule one or more resources and/or may not schedule one or more transmissions for the UE. The UE may not apply the timing offset to second information indicated by the DCI format, where the second information is separate from the first information indicated by the DCI format. The DCI format indicates a slot format combination for DL slots and UL slots. For example, the slot format combination may comprise a DL slot format combination for DL slots (e.g., the DL slot format combination may be indicative of slot formats for DL slots) and/or a UL slot format combination for UL slots (e.g., the UL slot format combination may be indicative of slot formats for UL slots). The UE may apply the timing offset to UL slots (and/or to one or more slot formats for UL slots). The UE may not apply the timing offset to DL slots (and/or to one or more slot formats for DL slots). The UE receives the DCI format in DL slot n. DL slots, for which one or more slot formats (and/or a slot format combination) are indicated by the DCI format 2_0, start from DL slot n. UL slots, for which one or more slot formats (and/or a slot format combination) are indicated by the DCI format 2_0, are identified based upon the timing offset. UL slots, for which one or more slot formats (and/or a slot format combination) are indicated by the DCI format 2_0, start from UL slot n+X, where X is based upon the timing offset. X may be equal to the timing offset. Alternatively and/or additionally, X may not be equal to the timing offset. The timing offset may be received from a base station. Alternatively and/or additionally, the timing offset may be determined based upon (and/or derived from) information provided by a base station. For example, the timing offset may be determined based upon (and/or derived from) a TA value. The TA value may be associated with the UE (e.g., the TA value may be a TA value of the UE). The TA value may be a smallest TA value among TA values associated with UEs in a cell (e.g., the UEs may correspond to some and/or all UEs in the cell). In some examples, the timing offset may be broadcasted. Alternatively and/or additionally, the timing offset may be indicated by a RRC configuration. In some examples, the RRC configuration is a configuration for slot format indication. In some examples, the timing offset may be the same as a timing offset applied for UL scheduling. Alternatively and/or additionally, the timing offset may be different than a timing offset applied for UL scheduling. In some examples, the timing offset may be indicated by a MAC control element. Alternatively and/or additionally, the timing offset may be indicated by a PDCCH and/or a DCI format. In some examples, the DCI format is a DCI format 2_0. The timing offset may be used to compensate a round-trip delay. In some examples, the UE uses a first value as a timing offset for slot format determination. Alternatively and/or additionally, the UE may use a second value as a timing offset for UL scheduling. The second value may be equal to the first value. Alternatively and/or additionally, the second value may not be equal to the first value. The UL scheduling may be for UL data, UL control and/or UL Reference Signal (RS).

In a second embodiment, a base station transmits a DCI format to a UE. The DCI format is for slot format indication (e.g., the DCI format indicates one or more slot formats). The base station applies a timing offset to first information indicated by the DCI format. In some examples, the DCI format is a DCI format 2_0. The DCI format may not schedule one or more resources and/or may not schedule one or more transmissions for the UE. The base station may not apply the timing offset to second information indicated by the DCI format, where the second information is separate from the first information indicated by the DCI format. The DCI format indicates a slot format combination for DL slots and UL slots. For example, the slot format combination may comprise a DL slot format combination for DL slots (e.g., the DL slot format combination may be indicative of slot formats for DL slots) and/or a UL slot format combination for UL slots (e.g., the UL slot format combination may be indicative of slot formats for UL slots). The base station may apply the timing offset to UL slots (and/or to one or more slot formats for UL slots). The base station may not apply the timing offset to DL slots (and/or to one or more slot formats for DL slots). The base station transmits the DCI format in DL slot n. DL slots, for which one or more slot formats (and/or a slot format combination) are indicated by the DCI format 2_0, start from DL slot n. UL slots, for which one or more slot formats (and/or a slot format combination) are indicated by the DCI format 2_0, are identified based upon the timing offset. UL slots, for which one or more slot formats (and/or a slot format combination) are indicated by the DCI format 2_0, start from UL slot n+X, where X is based upon the timing offset. X may be equal to the timing offset. Alternatively and/or additionally, X may not be equal to the timing offset. The base station may transmit the timing offset to the UE. Alternatively and/or additionally, the timing offset may be determined based upon (and/or derived from) information provided by the base station. For example, the timing offset may be determined based upon (and/or derived from) a TA value. The TA value may be associated with the UE (e.g., the TA value may be a TA value of the UE). The TA value may be a smallest TA value among TA values associated with UEs in a cell (e.g., the UEs may correspond to some and/or all UEs in the cell). In some examples, the timing offset may be broadcasted. Alternatively and/or additionally, the timing offset may be indicated by a RRC configuration. In some examples, the RRC configuration is a configuration for slot format indication. In some examples, the timing offset may be the same as a timing offset applied for UL scheduling. Alternatively and/or additionally, the timing offset may be different than a timing offset applied for UL scheduling. In some examples, the timing offset may be indicated by a MAC control element. Alternatively and/or additionally, the timing offset may be indicated by a PDCCH and/or a DCI format. In some examples, the DCI format is a DCI format 2_0. The timing offset may be used to compensate a round-trip delay. In some examples, the base station uses a first value as a timing offset for slot format. Alternatively and/or additionally, the base station may use a second value as a timing offset for UL scheduling. The second value may be equal to the first value. Alternatively and/or additionally, the second value may not be equal to the first value. The UL scheduling may be for UL data, UL control and/or UL RS.

In a third embodiment, a UE receives a DCI format from a base station. The DCI format is for slot format indication (e.g., the DCI format indicates one or more slot formats). In some examples, the DCI format is a DCI format 2_0. The DCI format may not schedule one or more resources and/or may not schedule one or more transmissions for the UE. The DCI format indicates a slot format combination for DL slots and UL slots. For example, the slot format combination may comprise a DL slot format combination for DL slots (e.g., the DL slot format combination may be indicative of slot formats for DL slots) and/or a UL slot format combination for UL slots (e.g., the UL slot format combination may be indicative of slot formats for UL slots). The UE receives the DCI format in a first DL slot, such as DL slot n. DL slots, for which one or more slot formats (and/or a slot format combination) are indicated by the DCI format 2_0, start from the first DL slot (e.g., DL slot n). UL slots, for which one or more slot formats (and/or a slot format combination) are indicated by the DCI format 2_0, start from a second UL slot, such as UL slot m. In some examples, m is different than n. In some examples, m is larger than n. In some examples, m is equal to n+X. In some examples, X is a timing offset. Alternatively and/or additionally, X may be a TA value. In some examples, the TA value is a TA value of the UE. Alternatively and/or additionally, the TA value may be a smallest TA value among TA values associated with UEs in a cell (e.g., the UEs may correspond to some and/or all UEs in the cell). Alternatively and/or additionally, the TA value may be a TA value for an earth point. In some examples, the earth point is closest to the base station. In some examples, the earth point may be the closest earth point, among a plurality of earth points, to the base station. Alternatively and/or additionally, the base station may be the closest base station, among a plurality of base stations, to the earth point. In some examples, the TA value is a TA value for an airplane. Alternatively and/or additionally, the TA value may be a TA value for an altitude for an airplane. In some examples, the altitude may be a highest altitude for the airplane (e.g., a highest altitude among one or more altitudes for the airplane). In some examples, the second UL slot (e.g., UL slot m) may be a closest UL slot (e.g., in time) to the first DL slot (e.g., DL slot n), such as taking the TA value into account. For example, amongst UL slots associated with the UE, the second UL slot (e.g., UL slot m) may be closest (e.g., in time) to the first DL slot (e.g., DL slot n), such as taking the TA value into account. Alternatively and/or additionally, the second UL slot (e.g., UL slot m) may overlap (e.g., in time) with the first DL slot (e.g., DL slot n). Alternatively and/or additionally, the second UL slot (e.g., UL slot m) may be after the first DL slot (e.g., DL slot n). In some examples, the second UL slot (e.g., UL slot m) may be a closest UL slot (e.g., in time) to reception of the DCI format. For example, amongst UL slots associated with the UE, the second UL slot (e.g., UL slot m) may be closest (e.g., in time) to a time at which the DCI format is received. Alternatively and/or additionally, a time at which the DCI format is received may be in the second UL slot (e.g., UL slot m). Alternatively and/or additionally, the second UL slot (e.g., UL slot m) may be the first (e.g., an initial) UL slot after (and/or when) receiving the DCI format. In some examples, the second UL slot (e.g., UL slot m) is indicated by the DCI format (e.g., the second UL slot may be identified as a starting slot of UL slots, for which one or more slot formats are indicated by the DCI format, based upon an indication of the second UL slot in the DCI format). In some examples, the second UL slot (e.g., UL slot m) may be a closest UL slot (e.g., in time) to the first DL slot (e.g., DL slot n), such as taking the TA value into account, where a difference between m and n (e.g., m-n) is a multiple of Q. Alternatively and/or additionally, the second UL slot (e.g., UL slot m) may overlap (e.g., in time) with the first DL slot (e.g., DL slot n), where a difference between m and n (e.g., m-n) is a multiple of Q. Alternatively and/or additionally, the second UL slot (e.g., UL slot m) may be after the first DL slot (e.g., DL slot n), where a difference between m and n (e.g., m-n) is a multiple of Q. In some examples, the second UL slot (e.g., UL slot m) may be a closest UL slot (e.g., in time) to reception of the DCI format, where a difference between m and n (e.g., m-n) is a multiple of Q. Alternatively and/or additionally, a time at which the DCI format is received may be in the second UL slot (e.g., UL slot m), where a difference between m and n (e.g., m-n) is a multiple of Q. Alternatively and/or additionally, the second UL slot (e.g., UL slot m) may be the first (e.g., an initial) UL slot after (and/or when) receiving the DCI format, where a difference between m and n (e.g., m-n) is a multiple of Q. In some examples, Q is a number of slots. Alternatively and/or additionally, Q may be determined based upon a TA difference between TA values of UEs in a cell. Alternatively and/or additionally, Q may be determined based upon a maximum TA difference associated with TA values of UEs in a cell. Alternatively and/or additionally, Q may be equal to the maximum TA difference. Alternatively and/or additionally, Q may be determined based upon a value N and the maximum TA difference (e.g., Q may be equal to N multiplied by the maximum TA difference). Alternatively and/or additionally, Q may be indicated by the base station. In some examples, the second UL slot (e.g., UL slot m) may be determined by an absolute timing (e.g., 2019 Jun. 1 AM 10:20:23.123649 . . . ). Alternatively and/or additionally, the second UL slot (e.g., UL slot m) may be determined by a clock of the UE. Alternatively and/or additionally, the second UL slot (e.g., UL slot m) may be determined by a GPS timing.

In a fourth embodiment, a base station transmits a DCI format to a UE. The DCI format is for slot format indication (e.g., the DCI format indicates one or more slot formats). In some examples, the DCI format is a DCI format 2_0. The DCI format may not schedule one or more resources and/or may not schedule one or more transmissions for the UE. The DCI format indicates a slot format combination for DL slots and UL slots. For example, the slot format combination may comprise a DL slot format combination for DL slots (e.g., the DL slot format combination may be indicative of slot formats for DL slots) and/or a UL slot format combination for UL slots (e.g., the UL slot format combination may be indicative of slot formats for UL slots). The UE receives the DCI format in a first DL slot, such as DL slot n. DL slots, for which one or more slot formats (and/or a slot format combination) are indicated by the DCI format 2_0, start from the first DL slot (e.g., DL slot n). UL slots, for which one or more slot formats (and/or a slot format combination) are indicated by the DCI format 2_0, start from a second UL slot, such as UL slot m. In some examples, m is different than n. In some examples, m is larger than n. In some examples, m is equal to n+X. In some examples, X is a timing offset. Alternatively and/or additionally, X may be a TA value. In some examples, the TA value is a TA value of the UE. Alternatively and/or additionally, the TA value may be a smallest TA value among TA values associated with UEs in a cell (e.g., the UEs may correspond to some and/or all UEs in the cell). Alternatively and/or additionally, the TA value may be a TA value for an earth point. In some examples, the earth point is closest to the base station. In some examples, the earth point may be the closest earth point, among a plurality of earth points, to the base station. Alternatively and/or additionally, the base station may be the closest base station, among a plurality of base stations, to the earth point. In some examples, the TA value is a TA value for an airplane. Alternatively and/or additionally, the TA value may be a TA value for an altitude for an airplane. In some examples, the altitude may be a highest altitude for the airplane (e.g., a highest altitude among one or more altitudes for the airplane). In some examples, the second UL slot (e.g., UL slot m) may be a closest UL slot (e.g., in time) to the first DL slot (e.g., DL slot n), such as taking the TA value into account. For example, amongst UL slots associated with the UE, the second UL slot (e.g., UL slot m) may be closest (e.g., in time) to the first DL slot (e.g., DL slot n), such as taking the TA value into account. Alternatively and/or additionally, the second UL slot (e.g., UL slot m) may overlap (e.g., in time) with the first DL slot (e.g., DL slot n). Alternatively and/or additionally, the second UL slot (e.g., UL slot m) may be after the first DL slot (e.g., DL slot n). In some examples, the second UL slot (e.g., UL slot m) may be a closest UL slot (e.g., in time) to reception of the DCI format. For example, amongst UL slots associated with the UE, the second UL slot (e.g., UL slot m) may be closest (e.g., in time) to a time at which the DCI format is received. Alternatively and/or additionally, a time at which the DCI format is received may be in the second UL slot (e.g., UL slot m). Alternatively and/or additionally, the second UL slot (e.g., UL slot m) may be the first (e.g., an initial) UL slot after (and/or when) receiving the DCI format. In some examples, the second UL slot (e.g., UL slot m) is indicated by the DCI format (e.g., the second UL slot may be identified as a starting slot of UL slots, for which one or more slot formats are indicated by the DCI format, based upon an indication of the second UL slot in the DCI format). In some examples, the second UL slot (e.g., UL slot m) may be a closest UL slot (e.g., in time) to the first DL slot (e.g., DL slot n), such as taking the TA value into account, where a difference between m and n (e.g., m-n) is a multiple of Q. Alternatively and/or additionally, the second UL slot (e.g., UL slot m) may overlap (e.g., in time) with the first DL slot (e.g., DL slot n), where a difference between m and n (e.g., m-n) is a multiple of Q. Alternatively and/or additionally, the second UL slot (e.g., UL slot m) may be after the first DL slot (e.g., DL slot n), where a difference between m and n (e.g., m-n) is a multiple of Q. In some examples, the second UL slot (e.g., UL slot m) may be a closest UL slot (e.g., in time) to reception of the DCI format, where a difference between m and n (e.g., m-n) is a multiple of Q. Alternatively and/or additionally, a time at which the DCI format is received may be in the second UL slot (e.g., UL slot m), where a difference between m and n (e.g., m-n) is a multiple of Q. Alternatively and/or additionally, the second UL slot (e.g., UL slot m) may be the first (e.g., an initial) UL slot after (and/or when) receiving the DCI format, where a difference between m and n (e.g., m-n) is a multiple of Q. In some examples, Q is a number of slots. Alternatively and/or additionally, Q may be determined based upon a TA difference between TA values of UEs in a cell. Alternatively and/or additionally, Q may be determined based upon a maximum TA difference associated with TA values of UEs in a cell. Alternatively and/or additionally, Q may be equal to the maximum TA difference. Alternatively and/or additionally, Q may be determined based upon a value N and the maximum TA difference (e.g., Q may be equal to N multiplied by the maximum TA difference). Alternatively and/or additionally, Q may be indicated by the base station. In some examples, the second UL slot (e.g., UL slot m) may be determined by an absolute timing (e.g., 2019 Oct. 1 AM 10:20:23.123649 . . . ). Alternatively and/or additionally, the second UL slot (e.g., UL slot m) may be determined by a clock of the base station. Alternatively and/or additionally, the second UL slot (e.g., UL slot m) may be determined by a GPS timing.

In a fifth embodiment, a UE receives a DCI format from a base station. The DCI format is for slot format indication (e.g., the DCI format indicates one or more slot formats). In some examples, the DCI format is a DCI format 2_0. The DCI format may not schedule one or more resources and/or may not schedule one or more transmissions for the UE. In some examples, the UE operates in paired spectrum. Alternatively and/or additionally, the UE may operate in unpaired spectrum. In some examples, the UE determines one or more slot formats for one or more DL slots and/or for DL transmission based upon the DCI format. In some examples, the UE does not determine one or more slot formats for one or more UL slots and/or for UL transmission based upon the DCI format. In some examples, the UE applies, based upon the DCI format, one or more slot formats for one or more DL slots and/or for DL transmission. In some examples, the UE does not apply, based upon the DCI format, one or more slot formats for one or more UL slots and/or for UL transmission (e.g., the UE may determine and/or apply slot formats for UL slots and/or for UL transmission based upon information separate from the DCI format). The DCI format indicates a slot format combination for DL slots and UL slots. For example, the slot format combination may comprise a DL slot format combination for DL slots (e.g., the DL slot format combination may be indicative of slot formats for DL slots) and/or a UL slot format combination for UL slots (e.g., the UL slot format combination may be indicative of slot formats for UL slots). In some examples, the UE does not apply the slot format combination (and/or the UL slot format combination) for UL slots and/or for UL transmission (e.g., the UE does not apply one or more slot formats, indicated by the slot format combination, for UL slots and/or for UL transmission). Alternatively and/or additionally, the UE may not utilize and/or use the slot format combination (and/or the UL slot format combination) for UL slots and/or for UL transmission (e.g., the UE does not utilize and/or use the slot format combination to determine slot formats for UL slots and/or for UL transmission). Alternatively and/or additionally, the UE may ignore at least a portion of the slot format combination that is for UL slots and/or for UL transmission (e.g., the UE may ignore the UL slot format combination). Alternatively and/or additionally, the UE may skip at least a portion of the slot format combination that is for UL slots and/or for UL transmission (e.g., the UE may skip the UL slot format combination). In some examples, the UE applies the slot format combination (and/or the DL slot format combination) for DL slots and/or for DL transmission. Alternatively and/or additionally, the UE may utilize the slot format combination (and/or the DL slot format combination) for DL slots and/or for DL transmission (e.g., the UE may utilize and/or use the slot format combination and/or the DL slot format combination to determine slot formats for DL slots and/or for DL transmission). In some examples, the slot format combination indicated by the DCI format may be indicative of slot formats for DL slots and/or for DL transmission and may not be indicative of slot formats for UL slots and/or for UL transmission. For example, the slot format combination indicated by the DCI format may comprise the DL slot format combination for DL slots and/or for DL transmission and may not comprise the UL slot format combination for UL slots and/or for UL transmission. The DCI format (and/or the slot format combination) may indicate one or more slot formats for one or more DL BWPs, DL spectrum and/or DL transmission. The DCI format (and/or the slot format combination) may not indicate slot formats for a UL BWP, UL spectrum and/or UL transmission. The slot format combination indicated by the DCI format may comprise one or more slot formats for one or more DL slots, one or more DL BWPs and/or DL spectrum and may not comprise one or more slot formats for UL slots, a UL BWP and/or UL spectrum. In some examples, slot formats in the slot format combination indicated by the DCI format (e.g., all slot formats in the slot format combination indicated by the DCI format) are for one or more DL slots, one or more DL BWPs and/or DL spectrum. Alternatively and/or additionally, slot formats in the slot format combination indicated by the DCI format (e.g., all slot formats in the slot format combination indicated by the DCI format) are not for UL slots, a UL BWP and/or UL spectrum. The UE applies the slot format combination indicated by the DCI format to one or more DL slots, one or more DL BWPs, DL spectrum and/or DL transmission and/or does not apply the slot format combination indicated by the DCI format to UL slots, a UL BWP, UL spectrum and/or UL transmission. One or more of the techniques and/or operations for implementing one or more embodiments of the fifth embodiment, such as generation and/or transmission of the DCI format that does not comprise slot formats for UL slots (and/or for a UL BWP, UL spectrum and/or UL transmission), may be enabled and/or disabled by a base station. For example, the DCI format may indicate a slot format combination for both DL slots (and/or for one or more DL BWPs, DL spectrum, and/or DL transmission) and for UL slots (and/or for one or more UL BWPs, UL spectrum, and/or UL transmission) if techniques and/or operations for generation and/or transmission of the DCI format that does not comprise slot formats for UL slots are disabled. Alternatively and/or additionally, the DCI format may indicate a slot format combination that can be applied both to DL slots (and/or to one or more DL BWPs, DL spectrum, and/or DL transmission) and to UL slots (and/or to one or more UL BWPs, UL spectrum, and/or UL transmission) if techniques and/or operations for generation and/or transmission of the DCI format that does not comprise slot formats for UL slots are disabled.

In a sixth embodiment, a base station transmits a DCI format to a UE. The DCI format is for slot format indication. The DCI format is for slot format indication (e.g., the DCI format indicates one or more slot formats). In some examples, the DCI format is a DCI format 2_0. The DCI format may not schedule one or more resources and/or may not schedule one or more transmissions for the UE. In some examples, the base station operates in paired spectrum. Alternatively and/or additionally, the base station may operate in unpaired spectrum. In some examples, the base station determines one or more slot formats for one or more DL slots and/or for DL transmission based upon the DCI format. In some examples, the base station does not determine one or more slot formats for one or more UL slots and/or for UL transmission based upon the DCI format. In some examples, the base station applies, based upon the DCI format, one or more slot formats for one or more DL slots and/or for DL transmission. In some examples, the base station does not apply, based upon the DCI format, one or more slot formats for one or more UL slots and/or for UL transmission. The DCI format indicates a slot format combination for DL slots and UL slots. For example, the slot format combination may comprise a DL slot format combination for DL slots (e.g., the DL slot format combination may be indicative of slot formats for DL slots) and/or a UL slot format combination for UL slots (e.g., the UL slot format combination may be indicative of slot formats for UL slots). In some examples, the base station does not apply the slot format combination (and/or the UL slot format combination) for UL slots and/or for UL transmission (e.g., the base station does not apply one or more slot formats, indicated by the slot format combination, for UL slots and/or for UL transmission). Alternatively and/or additionally, the base station may not utilize and/or use the slot format combination (and/or the UL slot format combination) for UL slots and/or for UL transmission. Alternatively and/or additionally, the base station may set values, corresponding to slot formats for UL slots, to reserved values and/or to known values. Alternatively and/or additionally, the base station may set values, corresponding to slot formats for UL slots, to values (e.g., any values), such as without considering slot format for UL. An example of a reserved value may be 0 (e.g., the base station may set values, corresponding to slot formats for UL slots, to 0). In some examples, the base station applies the slot format combination (and/or the DL slot format combination) for DL slots and/or for DL transmission. Alternatively and/or additionally, the base station may utilize the slot format combination (and/or the DL slot format combination) for DL slots and/or for DL transmission. In some examples, the slot format combination indicated by the DCI format may be indicative of slot formats for DL slots and/or for DL transmission and may not be indicative of slot formats for UL slots and/or for UL transmission. For example, the slot format combination indicated by the DCI format may comprise the DL slot format combination for DL slots and/or for DL transmission and may not comprise the UL slot format combination for UL slots and/or for UL transmission. The DCI format (and/or the slot format combination) may indicate one or more slot formats for one or more DL BWPs, DL spectrum and/or DL transmission. The DCI format (and/or the slot format combination) may not indicate slot formats for a UL BWP, UL spectrum and/or UL transmission. The slot format combination indicated by the DCI format may comprise one or more slot formats for one or more DL slots, one or more DL BWPs and/or DL spectrum and/or may not comprise one or more slot formats for UL slots, a UL BWP and/or UL spectrum. In some examples, slot formats in the slot format combination indicated by the DCI format (e.g., all slot formats in the slot format combination indicated by the DCI format) are for one or more DL slots, one or more DL BWPs and/or DL spectrum. Alternatively and/or additionally, slot formats in the slot format combination indicated by the DCI format (e.g., all slot formats in the slot format combination indicated by the DCI format) are not for UL slots, a UL BWP and/or UL spectrum. The UE and/or the base station apply the slot format combination indicated by the DCI format to one or more DL slots, one or more DL BWPs, DL spectrum and/or DL transmission and/or do not apply the slot format combination indicated by the DCI format to UL slots, a UL BWP, UL spectrum and/or UL transmission. One or more of the techniques and/or operations for implementing one or more embodiments of the sixth embodiment, such as generation and/or transmission of the DCI format that does not comprise slot formats for UL slots (and/or for a UL BWP, UL spectrum and/or UL transmission), may be enabled and/or disabled by the base station. For example, the DCI format may indicate a slot format combination for both DL slots (and/or for one or more DL BWPs, DL spectrum, and/or DL transmission) and for UL slots (and/or for one or more UL BWPs, UL spectrum, and/or UL transmission) if techniques and/or operations for generation and/or transmission of the DCI format that does not comprise slot formats for UL slots are disabled. Alternatively and/or additionally, the DCI format may indicate a slot format combination that can be applied both to DL slots (and/or to one or more DL BWPs, DL spectrum, and/or DL transmission) and to UL slots (and/or to one or more UL BWPs, UL spectrum, and/or UL transmission) if techniques and/or operations for generation and/or transmission of the DCI format that does not comprise slot formats for UL slots are disabled.

An example of not indicating slot format for UL slots (and/or not indicating slot format for a UL BWP and/or UL spectrum) in a DCI format, such as described with respect to the fifth embodiment and/or the sixth embodiment, is provided: For paired spectrum operation for a UE on a serving cell, the SFI-index field in a DCI format 2_0 indicates a combination of slot formats that comprises a combination of slot formats for a reference DL BWP of a serving cell. The UE is provided with a reference SCS (subcarrier spacing) configuration $\mu_{SFI, DL}$ via subcarrierSpacing, where the reference SCS configuration $\mu_{SFI, DL}$ is for the combination of slot formats indicated by the SFI-index field value in the DCI format 2_0 of the serving cell. Values (e.g., all values) for the combination of slot formats are applicable to the reference DL BWP. Alternatively and/or additionally, values (e.g., all values) provided by a value of slotFormats are applicable to the reference DL BWP, where the value of slotFormats is determined based upon a value of slotFormatCombinationID in slotFormatCombination and where the value of slotFormatCombinationID is set by the value of the SFI-index field value in the DCI format 2_0. Alternatively and/or additionally, for each values provided by a value of slotFormats, the values for the combination of slot formats are applicable to the reference DL BWP. The values for the combination of slot formats may be determined based upon at least one of a value of slotFormats, a value of slotFormatCombinationkl, the SFI-index field value, etc. and/or the values for the combination of slot formats (e.g., all values for the combination of slot formats) are applicable to the reference DL BWP (and/or to DL slots).

As shown in the above example, values (e.g., all values) of a slot format combination apply to DL (e.g., DL slots, a DL BWP and/or DL spectrum) and do not apply to UL (e.g., UL slots, a UL BWP and/or UL spectrum). This is different than some systems and/or techniques, where slot format for paired spectrum is indicated by transmitting a DCI format that indicates some values (of a slot format combination) applicable to DL (e.g., DL slots, a DL BWP and/or DL spectrum) and some values (of the slot format combination) applicable to UL (e.g., UL slots, a UL BWP and/or UL spectrum), and/or where some values (of the slot format combination) are applied to DL and some values (of the slot format combination) are applied to UL (e.g., such techniques are discussed in 3GPP TS 38.213 V15.6.0). Such techniques, such as where slot format for paired spectrum is indicated by transmitting a DCI format that indicates some values (of a slot format combination) applicable to DL and some values (of the slot format combination) applicable to UL, may be implemented in some embodiments of the present disclosure, such as in embodiments where a DCI format is provided that indicates slot formats for DL and slot formats for UL.

In a seventh embodiment, a base station does not configure a UE to monitor a DCI format for slot format indication in one or more cases. In some examples, the one or more cases comprise a case in which the base station operates in a NTN scenario. In some examples, the one or more cases comprise a case in which the base station is on a satellite. In some examples, the one or more cases comprise a case in which a propagation delay between the base station and the UE is larger than a threshold propagation delay. In some examples, the one or more cases comprise a case in which a TA value for the UE is larger than a threshold TA value. In some examples, at least one of the one or more cases is indicated by the base station (e.g., the base station may transmit, such as to the UE, an indication of at least one of the one or more cases). In some examples, the base station shall not configure the UE to monitor a DCI format for slot format indication in the one or more cases. In an example where the one or more cases comprise a case in which the base station operates in a NTN scenario, the base station may not configure a UE to monitor a DCI format for slot format indication if the base station operates in a NTN scenario. In an example where the one or more cases comprise a case in which the base station is on a satellite, the base station may not configure a UE to monitor a DCI format for slot format indication if the base station is on a satellite. In an example where the one or more cases comprise a case in which a propagation delay between the base station and a UE is larger than the threshold propagation delay, the base station may not configure the UE to monitor a DCI format for slot format indication if the propagation delay is larger than the threshold propagation delay. In an example where the one or more cases comprise a case in which a TA value for a UE is larger than the threshold TA value, the base station may not configure the UE to monitor a DCI format for slot format indication if the TA value for the UE is larger than the threshold TA value.

In an eighth embodiment, a UE is not configured and/or expected to monitor a DCI format for slot format indication in one or more cases. A UE receives a configuration from a base station, where the configuration does not (and/or shall not) indicate that the UE monitor a DCI format for slot format indication in at least one of the one or more cases. Alternatively and/or additionally, the configuration may indicate that the UE does not monitor a DCI format for slot format indication in at least one of the one or more cases. In some examples, the configuration is for slot format indication. In some examples, the one or more cases comprise a case in which the UE operates in a NTN scenario. In some examples, the one or more cases comprise a case in which a base station is on a satellite (e.g., the base station may be associated with the UE, for example, the base station may have a connection to the UE and/or may communicate with the UE). In some examples, the one or more cases comprise a case in which a propagation delay between a base station and the UE is larger than a threshold propagation delay (e.g., the base station may be associated with the UE, for example, the base station may have a connection to the UE and/or may communicate with the UE). In some examples, the one or more cases comprise a case in which a TA value for the UE is larger than a threshold TA value. In some examples, at least one of the one or more cases is indicated by a base station (e.g., the base station may transmit, such as to the UE, an indication of at least one of the one or more cases). In some examples, the base station shall not configure the UE to monitor a DCI format for slot format indication in the one or more cases.

Techniques, operations and/or behavior of a UE described herein with respect to the first embodiment, the second embodiment, the third embodiment, the fourth embodiment, the fifth embodiment, the sixth embodiment, the seventh embodiment, the eighth embodiment and/or other embodiments, may be correspondingly applied to and/or implemented by a base station.

Techniques, operations and/or behavior of a base station described herein with respect to the first embodiment, the second embodiment, the third embodiment, the fourth embodiment, the fifth embodiment, the sixth embodiment, the seventh embodiment, the eighth embodiment and/or other embodiments, may be correspondingly applied to and/or implemented by a UE.

In an example, a base station may determine and/or derive one or more times and/or one or more timings using one or more techniques and/or one or more operations described herein with respect to a UE (and/or the base station may determine and/or derive the one or more times and/or timings using techniques and/or operations similar to the one or more techniques and/or the one or more operations described herein with respect to a UE). Alternatively and/or additionally, a UE may determine and/or derive one or more times and/or one or more timings using one or more techniques and/or one or more operations described herein with respect to a base station (and/or the UE may determine and/or derive the one or more times and/or timings using techniques and/or operations similar to the one or more techniques and/or the one or more operations described herein with respect to a base station).

As shown in quoted segments of the foregoing description and/or other parts of the foregoing description, when a UE switches and/or changes from a first BWP to a second BWP based upon a DCI, the second BWP may be ready (and/or the second BWP may be used and/or available for use) from (e.g., beginning with) a first slot that is indicated by a slot offset value in the DCI. For example, the UE is not required to receive and/or transmit in a cell during a time duration that spans from the end of a symbol, of a slot in which the UE receives the DCI, until the beginning of the first slot indicated by the slot offset value in the DCI (e.g., the symbol may correspond to the third symbol of the slot in which the UE receives the DCI, where the third symbol of the slot may correspond to a symbol that is 2 symbols after an initial symbol of the slot). For example, if a DCI in DL slot n indicates to (and/or instructs) the UE to switch from a first BWP to a second BWP and a scheduling delay in the DCI is 8, the UE may be ready for transmission and/or reception (using the second BWP, for example) in UL slot n+8. The UE is not required to transmit or receive in a cell during a time duration that spans from the end of a symbol (e.g., the third symbol) of the DL slot n until the beginning of the UL slot n+8. In scenario(s) associated with NTN, such operation may not be possible. For example, in a NTN scenario, a TA may be larger than a threshold TA such as due to a large propagation delay (e.g., a propagation delay that is larger than a threshold propagation delay) in the NTN scenario. In an example, the TA may correspond to 100 slots. Accordingly, the UL slot n+8 may be before DL slot n and, thus, the UE is not ready for transmission and/or reception (using the second BWP, for example) in the UL slot n+8.

A BWP switch command may be used to change one or more power consumption characteristics of a UE. For example, a gNB may configure multiple BWPs (e.g., two BWPs), where a first BWP of the multiple BWPs is associated with higher power consumption (e.g., the first BWP may have a larger bandwidth and/or denser PDCCH monitoring occasions) and/or a second BWP of the multiple BWPs is associated with lower power consumption (e.g., the second BWP may have a smaller bandwidth and/or sparser PDCCH monitoring occasions). The first BWP (with higher power consumption) may be more suitable when a UE has ongoing data traffic and/or has more than a threshold amount of ongoing data traffic (e.g., the first BWP may be used when the UE has the ongoing data traffic such that the ongoing data traffic may be completed and/or finished earlier, more quickly and/or with less latency). The second BWP (with lower power consumption) may be more suitable when the UE does not have ongoing data traffic and/or has less than the threshold amount of ongoing data traffic (e.g., the second BWP may be used when the UE does not have ongoing data traffic to reduce power consumption of the UE and/or save UE power). In some examples, the second BWP is a default BWP. Adaptation and/or switching between the two types of BWP (e.g., the first BWP with higher power consumption and the second BWP with lower power consumption) can be performed with a BWP switch command and/or a timer. For example, the BWP switch command may correspond to a DCI and/or a PDCCH that indicates a BWP that is different from an active BWP (e.g., the active BWP may correspond to a BWP currently being used by a UE for communication).

However, as mentioned in the foregoing description, there may be a transition time (and/or an interruption time and/or a delay) associated with (e.g., during) a BWP switch (where a UE switches and/or changes from using a BWP to a different BWP). After receiving a BWP switch command (e.g., a BWP switch request) which schedules a data transmission, a UE may not perform a transmission and/or a reception between reception of the BWP switch command and the data transmission (e.g., the UE may not perform any transmission and/or any reception between reception of the BWP switch command and the data transmission). A period of time between reception of the BWP switch command and the data transmission may correspond to a scheduling delay. The scheduling delay should be sufficiently long to cover a BWP switch delay (e.g., a required BWP switch delay). However, if the scheduling delay is much larger than an interruption time (e.g., a required interruption time), such as if a duration by which the scheduling delay is larger than the interruption time exceeds a threshold, the UE does not (and/or cannot) start transmission and/or reception earlier than the end of the scheduling delay which may postpone transmission and/or reception of the UE. In an example, a BWP switch delay for a UE may be 1 ms, such as for 30 kHz subcarrier spacing. In the example, if the UE receives a BWP switch command in slot n to switch from one BWP associated with 30 kHz subcarrier spacing to another BWP associated with 30 kHz subcarrier spacing, the UE would be able to perform transmission and reception no later than slot n+2 (e.g., 1 ms corresponds to 2 slots with 30 kHz subcarrier spacing). However, if the UE receives, in slot n, a BWP switch command with a scheduling delay corresponding to 16 slots, the UE may not be able to perform transmission and/or reception (and/or any transmission and/or any reception) from the slot n to slot n+15. For example, the UE may not be able to perform transmission and/or reception (and/or any transmission and/or any reception) from a symbol of the slot n (e.g., a fourth symbol of the slot n or a symbol after the fourth symbol of the slot n) to slot n+15, given that the UE receives, decodes and/or processes the BWP switch command in slot n. A base station may indicate to and/or instruct a UE to switch from a BWP with higher power consumption to a BWP with lower power consumption when there is no ongoing traffic (and/or less than a threshold amount of ongoing traffic) between the base station and the UE. In some examples, an interruption time during which the UE is not able to receive information (and/or during which the UE is not able to receive any signal) may be determined based upon a scheduling delay of the BWP switch command.

In a fifth general concept of the present disclosure, a timing offset may be applied when determining an interruption time induced by a DCI. Alternatively and/or additionally, the timing offset may be applied when determining a slot in which the UE is ready for (and/or is able to perform) reception and/or transmission. For example, the slot in which the UE is ready for (and/or is able to perform) reception and/or transmission may be determined based upon the timing offset. The slot may be after the interruption time has elapsed. The timing offset may be applied for a DCI scheduling one or more UL transmissions. The timing offset may be applied for a DCI format 0_1. The timing offset may not be applied for a DCI scheduling one or more DL transmissions. The timing offset may not be applied for a DCI format 1_1. In some examples, the DCI indicates to (and/or instructs) the UE to switch from a first BWP to a second BWP. In some examples, the DCI is (and/or comprises) a BWP switch command. The interruption time may be determined based upon the timing offset. In some examples, the interruption time is determined based upon the timing offset and a scheduling delay. For example, the scheduling delay may be indicated by the DCI. In some examples, the timing offset is not indicated by the DCI. In some examples, such as where the interruption time is determined based upon the timing offset, a duration of the interruption time is the same as the timing offset (e.g., a duration of the interruption time may be equal to the timing offset). Alternatively and/or additionally, a duration of the interruption time may be equal to a sum of the scheduling delay and the timing offset. In some examples, the UE is not required to perform transmission and/or reception in a cell during the interruption time. In some examples, the UE is not required to perform transmission and/or reception in a cell during a time period between a DL slot in which the UE receives the DCI and a UL slot in which the UE is ready to (and/or able to) perform transmission and/or reception. For example, if a DCI format for UL scheduling is received in DL slot X, the DCI indicates to (and/or instructs) the UE to switch BWP (e.g., switch from using one BWP to another BWP), and the DCI indicates a scheduling delay (e.g., k0) with value Y, the UE may be ready (and/or able) to perform transmission and/or reception in (and/or beginning with) UL slot X+Y+Z. For example, the UE is not required to transmit and/or receive in a cell during a time duration that spans from a symbol of the DL slot X until the UL slot X+Y+Z (e.g., the time duration may span from the end of the third symbol of the DL slot X until the beginning of the UL slot X+Y+Z). Alternatively and/or additionally, the UE may be ready (and/or able) to perform transmission and/or reception in (and/or beginning with) UL slot X+Z. For example, the UE is not required to transmit and/or receive in a cell during a time duration that spans from a symbol of the DL slot X until the UL slot X+Z (e.g., the time duration may span from the end of the third symbol of DL slot X until the beginning of the UL slot X+Z). In some examples, Z is determined based upon the timing offset. For example, Z may be equal to the timing offset. Alternatively and/or additionally, Z may be determined based upon a TA value for the UE. Alternatively and/or additionally, Z may be equal to the TA value for the UE. In some examples, the timing offset is the same as (e.g., equal to) a timing offset for UL scheduling. Alternatively and/or additionally, the timing offset may be different than (e.g., not equal to) a timing offset for UL scheduling.

In a sixth general concept of the present disclosure, an effect of TA may be considered when determining an interruption time induced by a DCI. Alternatively and/or additionally, the effect of TA may be considered when determining a slot in which a UE is ready for (and/or is able to perform) reception and/or transmission. The slot may be after the interruption time. In some examples, the DCI schedules an UL transmission. The DCI may be a DCI format 0_1. In some examples, the DCI indicates to (and/or instructs) the UE to switch from a first BWP to a second BWP. In some examples, the DCI is (and/or comprises) a BWP switch command. In some examples, the UE receives the DCI in DL slot X, and the UE is ready for (and/or is able to perform) reception and/or transmission in UL slot X+Z. The UE may not be required to perform transmission and/or reception during a time duration that spans from the DL slot X (such as the end of the third symbol of the DL slot X) until UL slot X+Z (such as the beginning of the UL slot X+Z). In some examples, Z may be determined based upon a TA value of the UE. For example, Z may be equal to the TA value. Alternatively and/or additionally, Z may be determined based upon the TA value and a scheduling delay indicated by the DCI. In some examples, Z may be equal to a sum of the TA value and the scheduling. In some examples, the UL slot X+Z may be a closest UL slot (e.g., in time) to a DL slot X+Y. Y may be equal to a scheduling offset indicated by the DCI. In some examples, the UL slot X+Z may overlap (e.g., in time) with the DL slot X+Y. Alternatively and/or additionally, the UL slot X+Z may be after the DL slot X+Y. Alternatively and/or additionally, the UL slot X+Z may be the first (e.g., an initial) UL slot after the DL slot X+Y. In some examples, the UL slot X+Z may be Y slots after a UL slot X+Z−Y. In some examples, the UL slot X+Z−Y may be a closest UL slot (e.g., in time) to the DL slot X. In some examples, the UL slot X+Z−Y may overlap (e.g., in time) with the DL slot X. Alternatively and/or additionally, the UL slot X+Z−Y may be after the DL slot X. Alternatively and/or additionally, the UL slot X+Z−Y may be the first (e.g., an initial) UL slot after the DL slot X.

In a ninth embodiment, a UE receives a DCI format from a base station. The DCI format is for UL scheduling (e.g., the DCI format schedules an UL transmission). The DCI format indicates to (and/or instructs) the UE to switch BWP (such as to switch from using one BWP to using another BWP). In some examples, the DCI format induces an interruption time. The DCI format indicates to (and/or instructs) the UE to change active BWP, such as to change from using a first BWP (as the active BWP) to using a second BWP (as the active BWP). In some examples, the DCI format is DCI format 0_1. In some examples, the UE applies (e.g., uses) a timing offset to determine the interruption time induced by the DCI format. In some examples, the UE applies the timing offset to determine a slot in which the UE is ready for (and/or is able to perform) reception and/or transmission. The slot may be after the interruption time has elapsed. The timing offset may be applied for one or more DCIs scheduling one or more UL transmissions (e.g., the timing offset may be applied and/or used by the UE for determining interruption times when the UE receives DCIs that schedule UL transmissions). The timing offset may not be applied for one or more DCIs scheduling one or more DL transmissions (e.g., the timing offset may not be applied and/or used by the UE for determining interruption times when the UE receives DCIs that schedule DL transmissions). The timing offset may be applied for DCI format 0_1 (e.g., the timing offset may be applied and/or used by the UE for determining interruption times when the UE receives DCIs that are DCI format 0_1). The timing offset may not be applied for DCI format 1_1 (e.g., the timing offset may not be applied and/or used by the UE for determining interruption times when the UE receives DCIs that are DCI format 1_1). In some examples, the interruption time is determined based upon the timing offset. Alternatively and/or additionally, the interruption time may be determined based upon the timing offset and a scheduling delay. In some examples, the slot in which the UE is ready for (and/or is able to perform) transmission and/or reception is determined based upon the timing offset. Alternatively and/or additionally, the slot in which the UE is ready for (and/or is able to perform) transmission and/or reception is determined based upon the timing offset and the scheduling delay. In some examples, the UE is not required to perform transmission and/or reception during a time duration that spans until a slot, wherein the slot is determined based upon the timing offset. In some examples, the UE is not required to perform transmission and/or reception during a time duration that spans until a slot, wherein the slot is determined based upon the timing offset and the scheduling delay. In some examples, the scheduling delay is indicated by the DCI (e.g., the DCI comprises an indication of the scheduling delay). In some examples, the timing offset is not indicated by the DCI (e.g., the DCI may not comprise an indication of the timing offset). In some examples, a duration of the interruption time is the same as (e.g., equal to) the timing offset. In some examples, a duration of the interruption time is equal to a sum of the scheduling delay and the timing offset. In some examples, the UE is not required to perform transmission and/or reception during the interruption time. In some examples, the UE is not required to perform transmission and/or reception during a time period between a DL slot in which the UE receives the DCI and a UL slot in which the UE is ready (and/or able) to perform transmission and/or reception. In an example, if a DCI format for UL scheduling is received in DL slot X, the DCI indicates to (and/or instructs) the UE to switch BWP (e.g., switch from using one BWP to using another BWP), and the DCI indicates a scheduling delay (e.g., k0) with value Y, the UE may be ready (and/or able) to perform transmission and/or reception in (and/or beginning with) UL slot X+Y+Z. The UE may not be required to transmit and/or receive in a cell during a time duration that spans from a symbol of the DL slot X until the UL slot X+Y+Z (e.g., the time duration may span from the end of the third symbol of the DL slot X until the beginning of the UL slot X+Y+Z). Alternatively and/or additionally, the UE may be ready (and/or able) to perform transmission and/or reception in (and/or beginning with) UL slot X+Z. UE may not be required to transmit and/or receive in a cell during a time duration that spans from a symbol of the DL slot X until the UL slot X+Z (e.g., the time duration may span from the end of the third symbol of the DL slot X until the beginning of the UL slot X+Z). Z may be determined based upon the timing offset. Alternatively and/or additionally, Z may be equal to the timing offset. Alternatively and/or additionally, Z may be determined based upon the TA value for the UE. Alternatively and/or additionally, Z may be equal to a TA value for the UE. In some examples, the timing offset is the same as (e.g., equal to) a timing offset for UL scheduling. Alternatively and/or additionally, the timing offset may be different than (e.g., not equal to) a timing offset for UL scheduling. The timing offset may be broadcasted. In some examples, the timing offset is indicated by a RRC configuration (e.g., the UE may determine the timing offset by identifying an indication of the timing offset in the RRC configuration). In some examples, the RRC configuration is a configuration for PUSCH. In some examples, the timing offset is the same as a timing offset that is applied for UL scheduling. Alternatively and/or additionally, the timing offset may be different than a timing offset that is applied for UL scheduling. The timing offset may be indicated by a MAC control element. Alternatively and/or additionally, the timing offset may be indicated by a PDCCH and/or a DCI format. The DCI format may be DCI format 0_1. In some examples, the timing offset is used to compensate a round-trip delay. In some examples, the UE uses a first timing offset for one or more DCIs that are for UL scheduling (e.g., scheduling for UL data, UL control and/or UL RS) and that indicate BWP switch (e.g., the first timing offset may be applied and/or used by the UE for determining interruption times when the UE receives DCIs that schedule UL data (and/or UL control and/or UL RS) and that indicate to (and/or instruct) the UE to switch from using one BWP to another BWP). In some examples, the UE uses a second timing offset for one or more DCIs that are for UL scheduling (e.g., scheduling for UL data, UL control and/or UL RS) and that do not indicate BWP switch (e.g., the second timing offset may be applied and/or used by the UE for determining interruption times when the UE receives DCIs that schedule one or more UL transmissions and that do not indicate to (and/or instruct) the UE to switch from using one BWP to another BWP). In some examples, the first timing offset may be equal to a first value and the second timing offset may be equal to a second value. The first value may be the same as (e.g., equal to) the second value. Alternatively and/or additionally, the first value may be different than (e.g., not equal to) the second value.

In a tenth embodiment, a base station transmits a DCI format to a UE. The DCI format is for UL scheduling (e.g., the DCI format schedules an UL transmission). The DCI format indicates to (and/or instructs) the UE to switch BWP (such as to switch from using one BWP to using another BWP). In some examples, the DCI format induces an interruption time. The DCI format indicates to (and/or instructs) the UE to change active BWP, such as to change from using a first BWP (as the active BWP) to using a second BWP (as the active BWP). In some examples, the DCI format is DCI format 0_1. In some examples, the base station applies (e.g., uses) a timing offset to determine the interruption time induced by the DCI format. In some examples, the base station applies the timing offset to determine a slot in which the UE is ready for (and/or is able to perform) reception and/or transmission. The slot may be after the interruption time has elapsed. In some examples, the base station avoids scheduling the UE during the interruption time. Alternatively and/or additionally, the base station may schedule the UE based upon the interruption time. Alternatively and/or additionally, the base station may schedule the UE based upon a slot in which the UE is ready for reception and/or transmission. The slot may be after the interruption time has elapsed. In some examples, the base station schedules the UE based upon a time duration during which the UE is not required to perform transmission and/or reception. In some examples, the base station may schedule one or more transmissions and/or one or more receptions for the UE outside of the interruption time and/or the base station may not schedule one or more transmissions and/or one or more receptions for the UE during the interruption time. The timing offset may be applied for one or more DCIs scheduling one or more UL transmissions (e.g., the timing offset may be applied and/or used by the base station for determining interruption times when the base station transmits DCIs to the UE that schedule UL transmissions). The timing offset may not be applied for one or more DCIs scheduling one or more DL transmissions (e.g., the timing offset may not be applied and/or used by the base station for determining interruption times when the base station transmits DCIs to the UE that schedule DL transmissions). The timing offset may be applied for DCI format 0_1 (e.g., the timing offset may be applied and/or used by the base station for determining interruption times when the base station transmits DCIs to the UE that are DCI format 0_1). The timing offset may not be applied for DCI format 1_1 (e.g., the timing offset may not be applied and/or used by the base station for determining interruption times when the base station transmits DCIs to the UE that are DCI format 1_1). In some examples, the interruption time is determined based upon the timing offset. Alternatively and/or additionally, the interruption time may be determined based upon the timing offset and a scheduling delay. In some examples, the slot in which the UE is ready for (and/or is able to perform) transmission and/or reception is determined based upon the timing offset. Alternatively and/or additionally, the slot in which the UE is ready for (and/or is able to perform) transmission and/or reception is determined based upon the timing offset and the scheduling delay. In some examples, the UE is not required to perform transmission and/or reception during a time duration that spans until a slot, wherein the slot is determined based upon the timing offset. In some examples, the UE is not required to perform transmission and/or reception during a time duration that spans until a slot, wherein the slot is determined based upon the timing offset and the scheduling delay. In some examples, the scheduling delay is indicated by the DCI (e.g., the DCI comprises an indication of the scheduling delay). In some examples, the timing offset is not indicated by the DCI (e.g., the DCI may not comprise an indication of the timing offset). In some examples, a duration of the interruption time is the same as (e.g., equal to) the timing offset. In some examples, a duration of the interruption time is equal to a sum of the scheduling delay and the timing offset. In some examples, the UE is not required to perform transmission and/or reception during the interruption time. In some examples, the UE is not required to perform transmission and/or reception during a time period between a DL slot in which the UE receives the DCI and a UL slot in which the UE is ready (and/or able) to perform transmission and/or reception. In an example, if a DCI format for UL scheduling is received in DL slot X, the DCI indicates to (and/or instructs) the UE to switch BWP (e.g., switch from using one BWP to using another BWP), and the DCI indicates a scheduling delay (e.g., k0) with value Y, the UE may be ready (and/or able) to perform transmission and/or reception in (and/or beginning with) UL slot X+Y+Z. The UE may not be required to transmit and/or receive in a cell during a time duration that spans from a symbol of the DL slot X until the UL slot X+Y+Z (e.g., the time duration may span from the end of the third symbol of the DL slot X until the beginning of the UL slot X+Y+Z). Alternatively and/or additionally, the UE may be ready (and/or able) to perform transmission and/or reception in (and/or beginning with) UL slot X+Z. Alternatively and/or additionally, the UE may not be required to transmit and/or receive in a cell during a time duration that spans from a symbol of the DL slot X until the UL slot X+Z (e.g., the time duration may span from the end of the third symbol of the DL slot X until the beginning of the UL slot X+Z). Z may be determined based upon the timing offset. Alternatively and/or additionally, Z may be equal to the timing offset. Alternatively and/or additionally, Z may be determined based upon the TA value for the UE. Alternatively and/or additionally, Z may be equal to a TA value for the UE. In some examples, the timing offset is the same as (e.g., equal to) a timing offset for UL scheduling. Alternatively and/or additionally, the timing offset may be different than (e.g., not equal to) a timing offset for UL scheduling. The timing offset may be broadcasted. In some examples, the timing offset is indicated by a RRC configuration (e.g., the UE and/or the base station may determine the timing offset by identifying an indication of the timing offset in the RRC configuration). In some examples, the RRC configuration is a configuration for PUSCH. In some examples, the RRC configuration is transmitted, to the UE, by the base station. In some examples, the timing offset is the same as a timing offset that is applied for UL scheduling. Alternatively and/or additionally, the timing offset may be different than a timing offset that is applied for UL scheduling. The timing offset may be indicated by a MAC control element. Alternatively and/or additionally, the timing offset may be indicated by a PDCCH and/or a DCI format. The DCI format may be DCI format 0_1. In some examples, the timing offset is used to compensate a round-trip delay. In some examples, the UE and/or the base station use a first timing offset for one or more DCIs that are for UL scheduling (e.g., scheduling for UL data, UL control and/or UL RS) and that indicate BWP switch (e.g., the first timing offset may be applied and/or used by the UE and/or the base station for determining interruption times when the base station transmits DCIs to the UE that schedule UL data (and/or UL control and/or UL RS) and that indicate to (and/or instruct) the UE to switch from using one BWP to another BWP). In some examples, the UE and/or the base station use a second timing offset for one or more DCIs that are for UL scheduling (e.g., scheduling for UL data, UL control and/or UL RS) and that do not indicate BWP switch (e.g., the second timing offset may be applied and/or used by the UE and/or the base station for determining interruption times when the base station transmits DCIs to the UE that schedule one or more UL transmissions and that do not indicate to (and/or instruct) the UE to switch from using one BWP to another BWP). In some examples, the first timing offset may be equal to a first value and the second timing offset may be equal to a second value. The first value may be the same as (e.g., equal to) the second value. Alternatively and/or additionally, the first value may be different than (e.g., not equal to) the second value.

In an eleventh embodiment, a UE receives a DCI format from a base station. The DCI format is for UL scheduling (e.g., the DCI format schedules an UL transmission). The DCI format indicates to (and/or instructs) the UE to switch BWP (such as to switch from using one BWP to using another BWP). In an example, the DCI format indicates to (and/or instructs) the UE to switch UL BWP (such as to switch from using one UL BWP to using another UL BWP). In some examples, the DCI format induces an interruption time. The DCI format indicates to (and/or instructs) the UE to change active BWP, such as to change from using a first BWP (as the active BWP) to using a second BWP (as the active BWP). In an example, the DCI format indicates to (and/or instructs) the UE to change active UL BWP, such as to change from using a first UL BWP (as the active UL BWP) to using a second UL BWP (as the active UL BWP). In some examples, the DCI format is DCI format 0_1. The UE receives the DCI format in a first DL slot, such as DL slot X. In some examples, the UE determines the interruption time based upon the first DL slot and a TA value. Alternatively and/or additionally, the UE may determine the interruption time based upon the first DL slot, the TA value and a scheduling delay. In some examples, the UE determines, based upon the first DL slot and the TA value, a slot in which the UE is ready for (and/or is able to perform) reception and/or transmission. The slot may be after the interruption time has elapsed. Alternatively and/or additionally, the UE determines, based upon the first DL slot, the TA value and the scheduling delay, a slot in which the UE is ready for (and/or is able to perform) reception and/or transmission. The slot may be after the interruption time has elapsed. The UE may not be required to perform transmission and/or reception during a time duration. The time duration is from (and/or begins in) the first DL slot (e.g., the time duration may begin at the end of the third symbol of the first DL slot). Alternatively and/or additionally, the time duration may be until the beginning of a second UL slot (e.g., the time duration may end at the beginning of the second UL slot and/or the time duration may end at the end of a UL slot directly preceding the second UL slot). For example, the time duration may span from the end of the third symbol of the first DL slot to the beginning of the second UL slot (e.g., the time duration may not include the second UL slot and/or a portion of the second UL slot). In some examples, the UE is ready for reception and/or transmission from (e.g., beginning with) the second UL slot. The second UL slot may be after the interruption time (e.g., the second UL slot may be after the interruption time ends). In some examples, the second UL slot is a closest UL slot (e.g., in time) to a DL slot X+Y. In some examples, the second UL slot may overlap (e.g., in time) with the DL slot X+Y. Alternatively and/or additionally, the second UL slot may be after the DL slot X+Y. Alternatively and/or additionally, the second UL slot may be the first (e.g., an initial) UL slot after the DL slot X+Y. Alternatively and/or additionally, the second UL slot may be before the DL slot X+Y. Alternatively and/or additionally, the DL slot X+Y may be the first (e.g., an initial) DL slot after the second UL slot. In some examples, the second UL slot may be Y slots after a third UL slot. In some examples, the third UL slot is a closest UL slot (e.g., in time) to the first DL slot (e.g., DL slot X). In some examples, the third UL slot may overlap (e.g., in time) with the first DL slot. Alternatively and/or additionally, the third UL slot may be after the first DL slot. Alternatively and/or additionally, the third UL slot may be the first (e.g., an initial) UL slot after the first DL slot. Alternatively and/or additionally, the third UL slot may be before the first DL slot. Alternatively and/or additionally, the first DL slot may be the first (e.g., an initial) DL slot after the third UL slot. In some examples, the third UL slot may be UL slot X+Z. In some examples, Y may be determined based upon the scheduling delay. Alternatively and/or additionally, Y may be equal to the scheduling delay. In some examples, the second UL slot may be UL slot X+Y+Z. In some examples, Z may be determined based upon the TA value. Alternatively and/or additionally, Z may be equal to the TA value. In some examples, Z may be an integer that is closest to the TA value in units of slots (e.g., Z is an integer that is the closest integer to the TA value). The TA value in units of slots may correspond to a number of slots corresponding to the TA value. In an example, the TA value in units of slots may correspond to 10.3 slots and/or Z may be equal to 10 (e.g., Z may be equal to 10 based upon a determination that 10 is the closest integer to 10.3). Alternatively and/or additionally, Z may be a smallest integer that is larger than the TA value in units of slots. In an example, the TA value in units of slots may correspond to 10.3 slots and/or Z may be equal to 11 (e.g., Z may be equal to 11 based upon a determination that 11 is the smallest integer that is larger than 10.3). Alternatively and/or additionally, Z may be a largest integer that is smaller than the TA value in units of slots. In an example, the TA value in units of slots may correspond to 10.7 slots and/or Z may be equal to 10 (e.g., Z may be equal to 10 based upon a determination that 10 is the largest integer that is smaller than 10.7). In some examples, the TA value is for the UE (e.g., the TA value is a TA value of the UE). In some examples, Z is indicated by the base station (and/or a different base station). For example, the base station (and/or the different base station) may transmit, to the UE, an indication of Z. Alternatively and/or additionally, Z may be determined (and/or derived) by the UE. In some examples, the scheduling delay is indicated by the DCI format (e.g., the scheduling delay may be determined based upon a time domain resource allocation field of the DCI format).

In a twelfth embodiment, a base station transmits a DCI format to a UE. The DCI format is for UL scheduling (e.g., the DCI format schedules an UL transmission). The DCI format indicates to (and/or instructs) the UE to switch BWP (such as to switch from using one BWP to using another BWP). In an example, the DCI format indicates to (and/or instructs) the UE to switch UL BWP (such as to switch from using one UL BWP to using another UL BWP). In some examples, the DCI format induces an interruption time. The DCI format indicates to (and/or instructs) the UE to change active BWP, such as to change from using a first BWP (as the active BWP) to using a second BWP (as the active BWP). In an example, the DCI format indicates to (and/or instructs) the UE to change active UL BWP, such as to change from using a first UL BWP (as the active UL BWP) to using a second UL BWP (as the active UL BWP). In some examples, the DCI format is DCI format 0_1. The base station transmits the DCI format in a first DL slot, such as DL slot X. In some examples, the base station determines the interruption time based upon the first DL slot and a TA value. Alternatively and/or additionally, the base station may determine the interruption time based upon the first DL slot, the TA value and a scheduling delay. In some examples, the base station schedules the UE based upon the interruption time. In some examples, the base station may schedule one or more transmissions and/or one or more receptions for the UE outside of the interruption time and/or the base station may not schedule one or more transmissions and/or one or more receptions for the UE during the interruption time. In some examples, the base station determines, based upon the first DL slot and the TA value, a slot in which the UE is ready for (and/or is able to perform) reception and/or transmission. The slot may be after the interruption time has elapsed. Alternatively and/or additionally, the base station determines, based upon the first DL slot, the TA value and the scheduling delay, a slot in which the UE is ready for (and/or is able to perform) reception and/or transmission. The slot may be after the interruption time has elapsed. Alternatively and/or additionally, the base station may schedule the UE based upon a slot in which the UE is ready for reception and/or transmission. The slot may be after the interruption time has elapsed. The UE may not be required to perform transmission and/or reception during a time duration. In some examples, the base station may schedule the UE based upon the time duration. The time duration is from (and/or begins in) the first DL slot (e.g., the time duration may begin at the end of the third symbol of the first DL slot). Alternatively and/or additionally, the time duration may be until the beginning of a second UL slot (e.g., the time duration may end at the beginning of the second UL slot and/or the time duration may end at the end of a UL slot directly preceding the second UL slot). For example, the time duration may span from the end of the third symbol of the first DL slot to the beginning of the second UL slot (e.g., the time duration may not include the second UL slot and/or a portion of the second UL slot). In some examples, the UE is ready for reception and/or transmission from (e.g., beginning with) the second UL slot. The second UL slot may be after the interruption time (e.g., the second UL slot may be after the interruption time ends). In some examples, the second UL slot is a closest UL slot (e.g., in time) to a DL slot X+Y. In some examples, the second UL slot may overlap (e.g., in time) with the DL slot X+Y. Alternatively and/or additionally, the second UL slot may be after the DL slot X+Y. Alternatively and/or additionally, the second UL slot may be the first (e.g., an initial) UL slot after the DL slot X+Y. Alternatively and/or additionally, the second UL slot may be before the DL slot X+Y. Alternatively and/or additionally, the DL slot X+Y may be the first (e.g., an initial) DL slot after the second UL slot. In some examples, the second UL slot may be Y slots after a third UL slot. In some examples, the third UL slot is a closest UL slot (e.g., in time) to the first DL slot (e.g., DL slot X). In some examples, the third UL slot may overlap (e.g., in time) with the first DL slot. Alternatively and/or additionally, the third UL slot may be after the first DL slot. Alternatively and/or additionally, the third UL slot may be the first (e.g., an initial) UL slot after the first DL slot. Alternatively and/or additionally, the third UL slot may be before the first DL slot. Alternatively and/or additionally, the first DL slot may be the first (e.g., an initial) DL slot after the third UL slot. In some examples, the third UL slot may be UL slot X+Z. In some examples, Y may be determined based upon the scheduling delay. Alternatively and/or additionally, Y may be equal to the scheduling delay. In some examples, the second UL slot may be UL slot X+Y+Z. In some examples, Z may be determined based upon the TA value. Alternatively and/or additionally, Z may be equal to the TA value. In some examples, Z may be an integer that is closest to the TA value in units of slots. The TA value in units of slots may correspond to a number of slots corresponding to the TA value. In an example, the TA value in units of slots may correspond to 10.3 slots and/or Z may be equal to 10 (e.g., Z may be equal to 10 based upon a determination that 10 is the closest integer to 10.3). Alternatively and/or additionally, Z may be a smallest integer that is larger than the TA value in units of slots. In an example, the TA value in units of slots may correspond to 10.3 slots and/or Z may be equal to 11 (e.g., Z may be equal to 11 based upon a determination that 11 is the smallest integer that is larger than 10.3). Alternatively and/or additionally, Z may be a largest integer that is smaller than the TA value in units of slots. In an example, the TA value in units of slots may correspond to 10.7 slots and/or Z may be equal to 10 (e.g., Z may be equal to 10 based upon a determination that 10 is the largest integer that is smaller than 10.7). In some examples, the TA value is for the UE (e.g., the TA value is a TA value of the UE). In some examples, Z is indicated by the base station (and/or a different base station). For example, the base station (and/or the different base station) may transmit, to the UE, an indication of Z. Alternatively and/or additionally, Z may be determined (and/or derived) by the UE. In some examples, the scheduling delay is indicated by the DCI format (e.g., the scheduling delay may be determined based upon a time domain resource allocation field of the DCI format).

Techniques, operations and/or behavior of a UE described herein with respect to the ninth embodiment, the tenth embodiment, the eleventh embodiment, the twelfth embodiment and/or other embodiments, may be correspondingly applied to and/or implemented by a base station.

Techniques, operations and/or behavior of a base station described herein with respect to the ninth embodiment, the tenth embodiment, the eleventh embodiment, the twelfth embodiment and/or other embodiments, may be correspondingly applied to and/or implemented by a UE.

In an example, a base station may determine and/or derive one or more times and/or one or more timings using one or more techniques and/or one or more operations described herein with respect to a UE (and/or the base station may determine and/or derive the one or more times and/or timings using techniques and/or operations similar to the one or more techniques and/or the one or more operations described herein with respect to a UE). Alternatively and/or additionally, a UE may determine and/or derive one or more times and/or one or more timings using one or more techniques and/or one or more operations described herein with respect to a base station (and/or the UE may determine and/or derive the one or more times and/or timings using techniques and/or operations similar to the one or more techniques and/or the one or more operations described herein with respect to a base station).

In an example, if a UE prohibits and/or suspends reception and/or transmission (e.g., reception and/or transmission in a cell and/or reception and/or transmission to and/or from a base station) during a period of time, the base station may prohibit and/or suspend reception and/or transmission (e.g., reception and/or transmission in a cell and/or reception and/or transmission to and/or from the UE) during the same period of time.

In an example, a base station may determine and/or derive an interruption time using one or more techniques and/or one or more operations described herein with respect to a UE (and/or the base station may determine and/or derive the interruption time using techniques and/or operations similar to the one or more techniques and/or the one or more operations described herein with respect to a UE). Alternatively and/or additionally, a UE may determine and/or derive an interruption time using one or more techniques and/or one or more operations described herein with respect to a base station (and/or the UE may determine and/or derive the interruption time using techniques and/or operations similar to the one or more techniques and/or the one or more operations described herein with respect to a base station).

One, some and/or all of the foregoing techniques and/or embodiments can be formed to a new embodiment.

In some examples, embodiments disclosed herein, such as embodiments described with respect to the first general concept, the second general concept, the third general concept, the fourth general concept, the fifth general concept, the sixth general concept, the first embodiment, the second embodiment, the third embodiment, the fourth embodiment, the fifth embodiment, the sixth embodiment, the seventh embodiment, the eighth embodiment, the ninth embodiment, the tenth embodiment, the eleventh embodiment and the twelfth embodiment, may be implemented independently and/or separately. Alternatively and/or additionally, a combination of embodiments described herein, such as embodiments described with respect to the first general concept, the second general concept, the third general concept, the fourth general concept, the fifth general concept, the sixth general concept, the first embodiment, the second embodiment, the third embodiment, the fourth embodiment, the fifth embodiment, the sixth embodiment, the seventh embodiment, the eighth embodiment, the ninth embodiment, the tenth embodiment, the eleventh embodiment and/or the twelfth embodiment, may be implemented. Alternatively and/or additionally, a combination of embodiments described herein, such as embodiments described with respect to the first general concept, the second general concept, the third general concept, the fourth general concept, the fifth general concept, the sixth general concept, the first embodiment, the second embodiment, the third embodiment, the fourth embodiment, the fifth embodiment, the sixth embodiment, the seventh embodiment, the eighth embodiment, the ninth embodiment, the tenth embodiment, the eleventh embodiment and/or the twelfth embodiment, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 7:
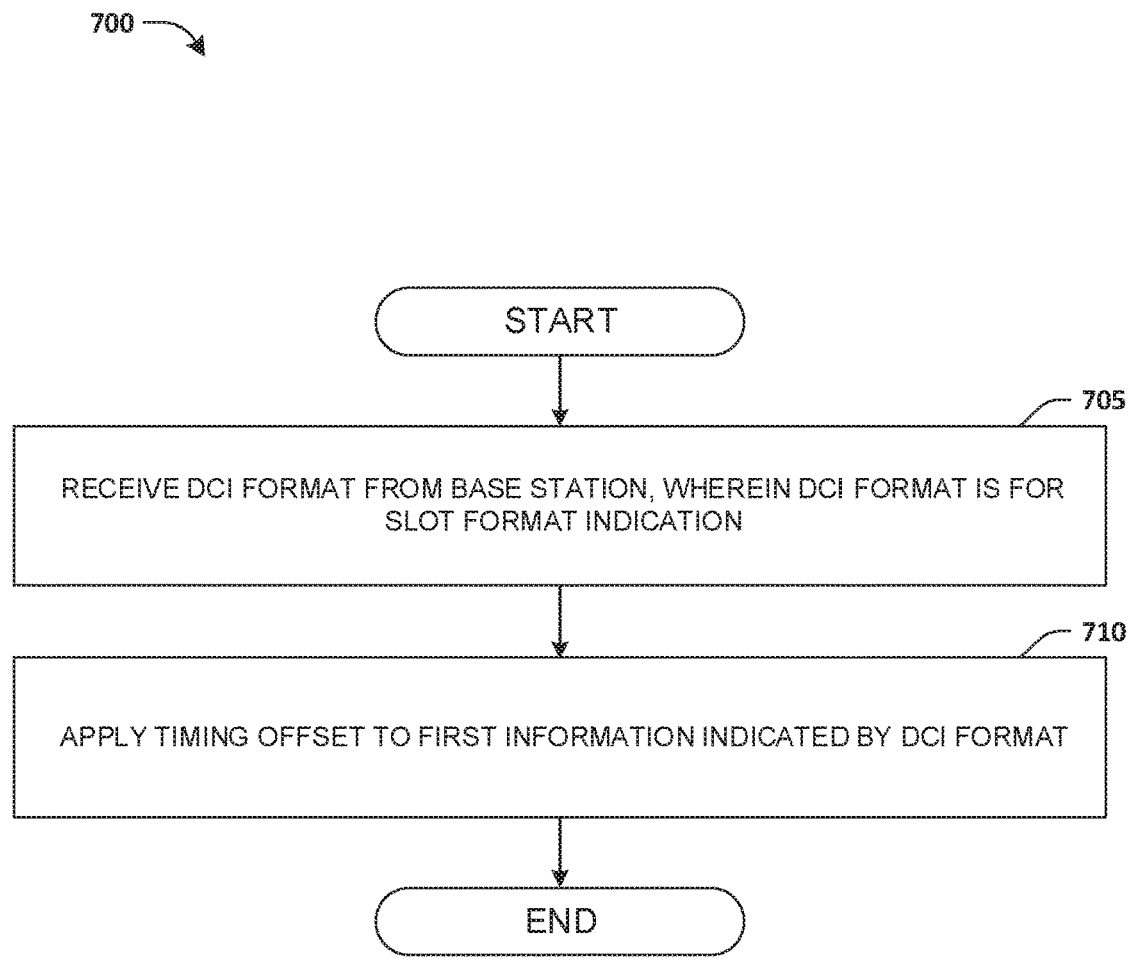
FIG. 7 is a flow chart according to one exemplary embodiment.

FIG. 7 is a flow chart 700 according to one exemplary embodiment from the perspective of a UE. In step 705, the UE receives a DCI format from a base station, wherein the DCI format is for slot format indication (e.g., the DCI format indicates slot formats). In step 710, the UE applies a timing offset to first information indicated by the DCI format.

In one embodiment, the DCI format is DCI format 2_0.

In one embodiment, the DCI format does not schedule one or more resources for the UE and/or does not schedule one or more transmissions for the UE.

In one embodiment, the DCI format indicates second information other than the first information, and the UE does not apply the timing offset to the second information indicated by the DCI format.

In one embodiment, the DCI format indicates a slot format combination for DL slots and UL slots.

In one embodiment, the first information comprises slot formats that are for UL slots.

In one embodiment, the second information comprises slot formats that are for DL slots.

In one embodiment, the UE applies the timing offset to UL slots.

In one embodiment, the UE applies the timing offset to slot formats, of the slot format combination, that are for UL slots.

In one embodiment, the UE does not apply the timing offset to DL slots.

In one embodiment, the UE does not apply the timing offset to slot formats that are for DL slots.

In one embodiment, the UE receives the DCI format in DL slot n.

Referring back to FIGS. 3 and 4, in one exemplary embodiment of a UE, the device 300 includes a program code 312 stored in the memory 310. The CPU 308 could execute program code 312 to enable the UE (i) to receive a DCI format from a base station, wherein the DCI format is for slot format indication, and (ii) to apply a timing offset to first information indicated by the DCI format. Furthermore, the CPU 308 can execute the program code 312 to perform one, some and/or all of the above-described actions and steps and/or others described herein.

Figure 8:
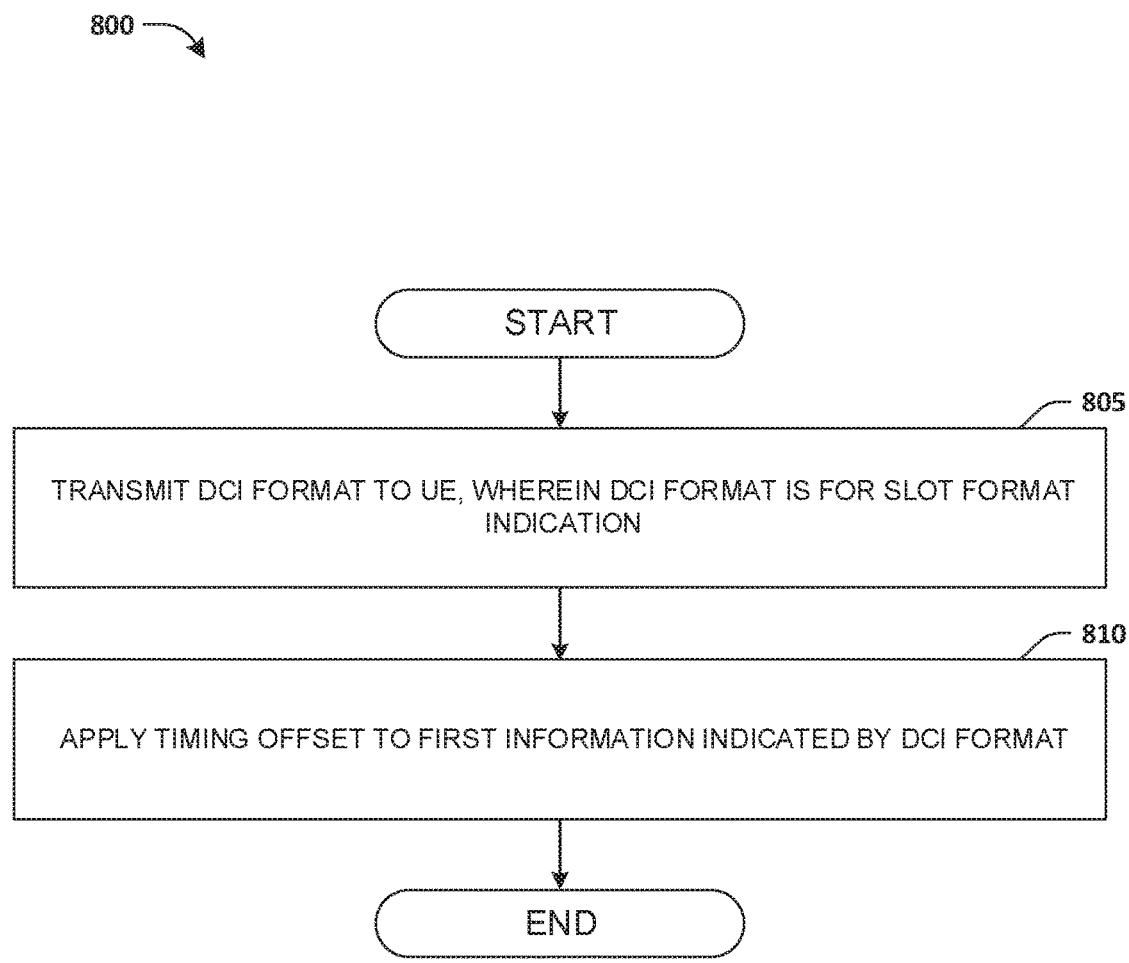
FIG. 8 is a flow chart according to one exemplary embodiment.

FIG. 8 is a flow chart 800 according to one exemplary embodiment from the perspective of a base station. In step 805, the base station transmits a DCI format to a UE, wherein the DCI format is for slot format indication (e.g., the DCI format indicates slot formats). In step 810, the base station applies a timing offset to first information indicated by the DCI format.

In one embodiment, the DCI format is DCI format 2_0.

In one embodiment, the DCI format does not schedule one or more resources for the UE and/or does not schedule one or more transmissions for the UE.

In one embodiment, the DCI format indicates second information other than the first information, and the base station does not apply the timing offset to the second information indicated by the DCI format.

In one embodiment, the DCI format indicates a slot format combination for DL slots and UL slots.

In one embodiment, the first information comprises slot formats that are for UL slots.

In one embodiment, the second information comprises slot formats that are for DL slots.

In one embodiment, the base station applies the timing offset to UL slots.

In one embodiment, the base station applies the timing offset to slot formats, of the slot format combination, that are for UL slots.

In one embodiment, the base station does not apply the timing offset to DL slots.

In one embodiment, the base station does not apply the timing offset to slot formats that are for DL slots.

In one embodiment, the base station transmits the DCI format in DL slot n.

Referring back to FIGS. 3 and 4, in one exemplary embodiment of a base station, the device 300 includes a program code 312 stored in the memory 310. The CPU 308 could execute program code 312 to enable the base station (i) to transmit a DCI format to a UE, wherein the DCI format is for slot format indication, and (ii) to apply a timing offset to first information indicated by the DCI format. Furthermore, the CPU 308 can execute the program code 312 to perform one, some and/or all of the above-described actions and steps and/or others described herein.

With respect to FIGS. 7-8, in one embodiment, DL slots, for which slot formats (and/or a slot format combination) are indicated by the DCI format, start from the DL slot n (e.g., the DL slot n is an initial DL slot of the DL slots).

In one embodiment, UL slots, for which slot formats (and/or a slot format combination) are indicated by the DCI format, are determined based upon the timing offset.

In one embodiment, UL slots, for which slot formats (and/or a slot format combination) are indicated by the DCI format, start from UL slot n+X (e.g., the UL slot n+X is an initial UL slot of the UL slots).

In one embodiment, X is based upon the timing offset.

In one embodiment, X is equal to the timing offset.

In one embodiment, the UE receives the timing offset from the base station.

In one embodiment, the timing offset is determined based upon information provided by the base station (e.g., the base station may transmit the information to the UE and/or the timing offset may be derived from the information).

In one embodiment, the timing offset is determined based upon a TA value (e.g., the timing offset may be derived from the TA value).

In one embodiment, the TA value is associated with the UE (e.g., the TA value is a TA value of the UE).

In one embodiment, the TA value may be a smallest TA value among TA values associated with UEs in a cell (e.g., the UEs may correspond to some and/or all UEs in the cell).

In one embodiment, the timing offset may be broadcasted (such as by the base station and/or a different base station).

In one embodiment, the timing offset is indicated by a RRC configuration (such as transmitted by the base station and/or a different base station).

In one embodiment, the RRC configuration is a configuration for slot format indication.

In one embodiment, the timing offset is the same as (e.g., equal to) a second timing offset applied for UL scheduling.

In one embodiment, the timing offset is different than (e.g., not equal to) a second timing offset applied for UL scheduling.

In one embodiment, the timing offset is indicated by a MAC control element (such as transmitted by the base station and/or a different base station).

In one embodiment, the timing offset is indicated by a PDCCH and/or a second DCI format (such as transmitted by the base station and/or a different base station).

In one embodiment, the second DCI format may be DCI format 2_0.

In one embodiment, the timing offset is used to compensate a round-trip delay (e.g., a round-trip delay associated with the base station and the UE which may take into account propagation time associated with communication between the base station and the UE).

In one embodiment, the timing offset that the UE applies to UL slots and/or slot formats for UL slots is equal to a first value.

In one embodiment, the UE applies a second timing offset for UL scheduling and the second timing offset is equal to a second value.

In one embodiment, the first value is the same as (e.g., equal to) the second value.

In one embodiment, the first value is different than (e.g., not equal to) the second value.

In one embodiment, the UL scheduling may be for UL data, UL control and/or UL RS.

Figure 9:
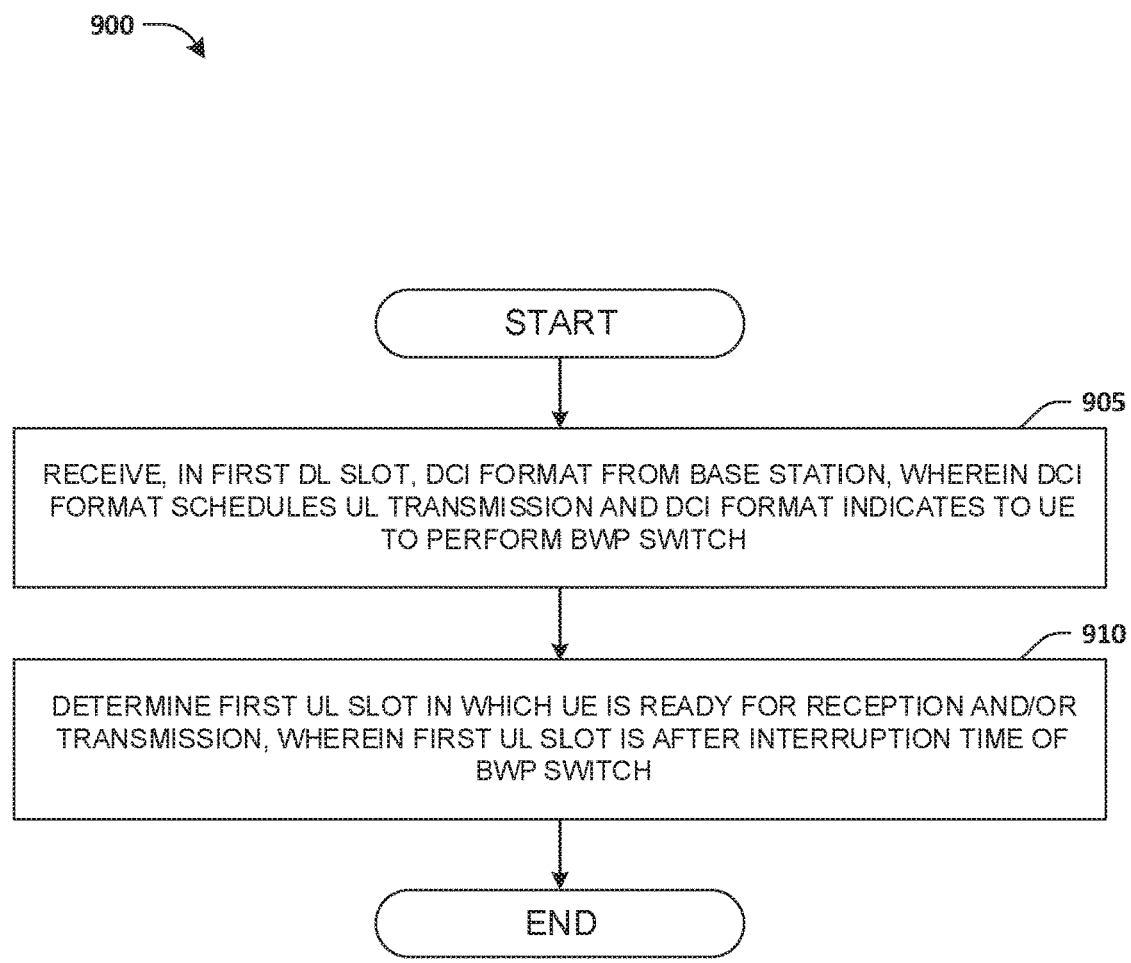
FIG. 9 is a flow chart according to one exemplary embodiment.

FIG. 9 is a flow chart 900 according to one exemplary embodiment from the perspective of a UE. In step 905, the UE receives, in a first DL slot, a DCI format from a base station, wherein the DCI format schedules an UL transmission and the DCI format indicates to (and/or instructs) the UE to perform a BWP switch. In step 910, the UE determines a first UL slot in which the UE is ready for reception and/or transmission, wherein the first UL slot is after an interruption time of the BWP switch.

In one embodiment, the DCI format is DCI format 0_1.

In one embodiment, the UE determines the interruption time based upon a TA value.

In one embodiment, the UE determines, based upon the TA value, a time duration during which the UE is not required to transmit and/or receive.

In one embodiment, the first UL slot is determined (such as by the UE) based upon the TA value.

In one embodiment, the UE does not use the TA value to determine a second DL slot in which the UE is ready for reception and/or transmission after a second interruption time of a second BWP switch for a second DCI format scheduling a DL transmission.

In one embodiment, the UE does not use the TA value to determine a second interruption time of a second BWP switch for a second DCI format scheduling a DL transmission.

Referring back to FIGS. 3 and 4, in one exemplary embodiment of a UE, the device 300 includes a program code 312 stored in the memory 310. The CPU 308 could execute program code 312 to enable the UE (i) to receive, in a first DL slot, a DCI format from a base station, wherein the DCI format schedules an UL transmission and the DCI format indicates to (and/or instructs) the UE to perform a BWP switch, and (ii) to determine a first UL slot in which the UE is ready for reception and/or transmission, wherein the first UL slot is after an interruption time of the BWP switch. Furthermore, the CPU 308 can execute the program code 312 to perform one, some and/or all of the above-described actions and steps and/or others described herein.

Figure 10:
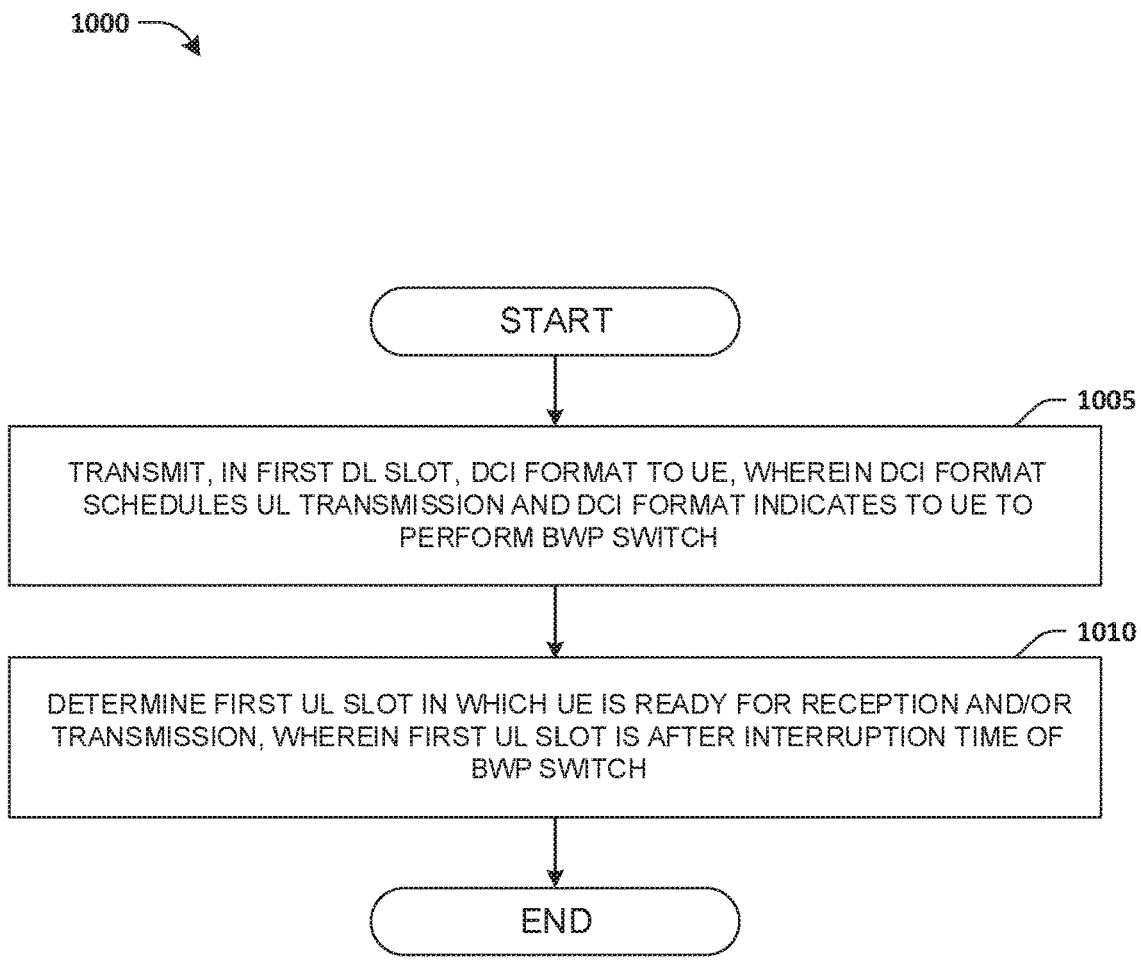
FIG. 10 is a flow chart according to one exemplary embodiment.

FIG. 10 is a flow chart 1000 according to one exemplary embodiment from the perspective of a base station. In step 1005, the base station transmits, in a first DL slot, a DCI format to a UE, wherein the DCI format schedules an UL transmission and the DCI format indicates to (and/or instructs) the UE to perform a BWP switch. In step 1010, the base station determines a first UL slot in which the UE is ready for reception and/or transmission, wherein the first UL slot is after an interruption time of the BWP switch.

In one embodiment, the DCI format is DCI format 0_1.

In one embodiment, the base station determines the interruption time of the BWP switch based upon a TA value.

In one embodiment, the based station determines, based upon the TA value, a time duration during which the UE is not required to transmit and/or receive.

In one embodiment, the first UL slot is determined (such as by the base station) based upon the TA value.

In one embodiment, the base station does not use the TA value to determine a second DL slot in which the UE is ready for reception and/or transmission after a second interruption time of a second BWP switch for a second DCI format scheduling a DL transmission.

In one embodiment, the base station does not use the TA value to determine a second interruption time of a second BWP switch for a second DCI format scheduling a DL transmission.

Referring back to FIGS. 3 and 4, in one exemplary embodiment of a base station, the device 300 includes a program code 312 stored in the memory 310. The CPU 308 could execute program code 312 to enable the base station (i) to transmit, a DCI format in a first DL slot to a UE, wherein the DCI format schedules an UL transmission and the DCI format indicates to (and/or instructs) the UE to perform a BWP switch, and (ii) to determine a first UL slot in which the UE is ready for reception and/or transmission, wherein the first UL slot is after an interruption time of the BWP switch. Furthermore, the CPU 308 can execute the program code 312 to perform one, some and/or all of the above-described actions and steps and/or others described herein.

With respect to FIGS. 9-10, the first UL slot is X slots after a second UL slot, wherein X is equal to a scheduling delay indicated in the DCI format. In an example where X is equal to 1, the first UL slot is 1 slot after the second UL slot (e.g., the first UL slot is directly after the second UL slot). In an example, where X is equal to 10, the first UL slot is 10 slots after the second UL slot (e.g., there are 9 UL slots that are after the second UL slot and that precede the first UL slot).

In one embodiment, the second UL slot is a closest UL slot (e.g., in time) to the first DL slot.

In one embodiment, the second UL slot overlaps (e.g., in time) with the first DL slot.

In one embodiment, the second UL slot is after the first DL slot.

In one embodiment, the second UL slot is an initial UL slot after the first DL slot (e.g., there may be no UL slot associated with the UE that is both after the first DL slot and before the second UL slot).

In one embodiment, the second UL slot is before the first DL slot.

In one embodiment, the first DL slot is an initial DL slot after the second UL slot (e.g., there may be no DL slot associated with the UE that is both after the second UL slot and before the first DL slot).

In one embodiment, the first UL slot is a closest UL slot (e.g., in time) to a third DL slot.

In one embodiment, the first UL slot overlaps (e.g., in time) with the third DL slot.

In one embodiment, the first UL slot is after the third DL slot.

In one embodiment, the first UL slot is an initial UL slot after the third DL slot (e.g., there may be no UL slot associated with the UE that is both after the third DL slot and before the first UL slot).

In one embodiment, the first UL slot is before the third DL slot.

In one embodiment, the third DL slot is an initial DL slot after the first UL slot (e.g., there may be no DL slot associated with the UE that is both after the first UL slot and before the third DL slot).

In one embodiment, the third DL slot is X slots after the first DL slot (e.g., X is equal to the scheduling delay indicated in the DCI format).

In one embodiment, the first UL slot is determined based upon a scheduling offset.

In one embodiment, the first DL slot is DL slot n and the first UL slot is UL slot n+Z, where Z is based upon the TA value and the scheduling delay.

In one embodiment, Z is equal to a sum of the TA value and the scheduling delay.

In one embodiment, the TA value is in units of slots (e.g., the TA value corresponds to a number of slots, such as at least one of 10 slots, 20 slots, 40 slots, etc.).

In one embodiment, Z is an integer that is closest to a sum of the TA value and the scheduling delay (e.g., Z is an integer that is the closest integer to the sum of the TA value and the scheduling delay).

In one embodiment, Z is a smallest integer that is larger than a sum of the TA value and the scheduling delay.

In one embodiment, Z is a largest integer that is smaller than a sum of the TA value and the scheduling delay.

In one embodiment, the scheduling delay is indicated by the DCI format (e.g., the scheduling delay may be indicated in a time domain resource allocation field of the DCI format).

Figure 11:
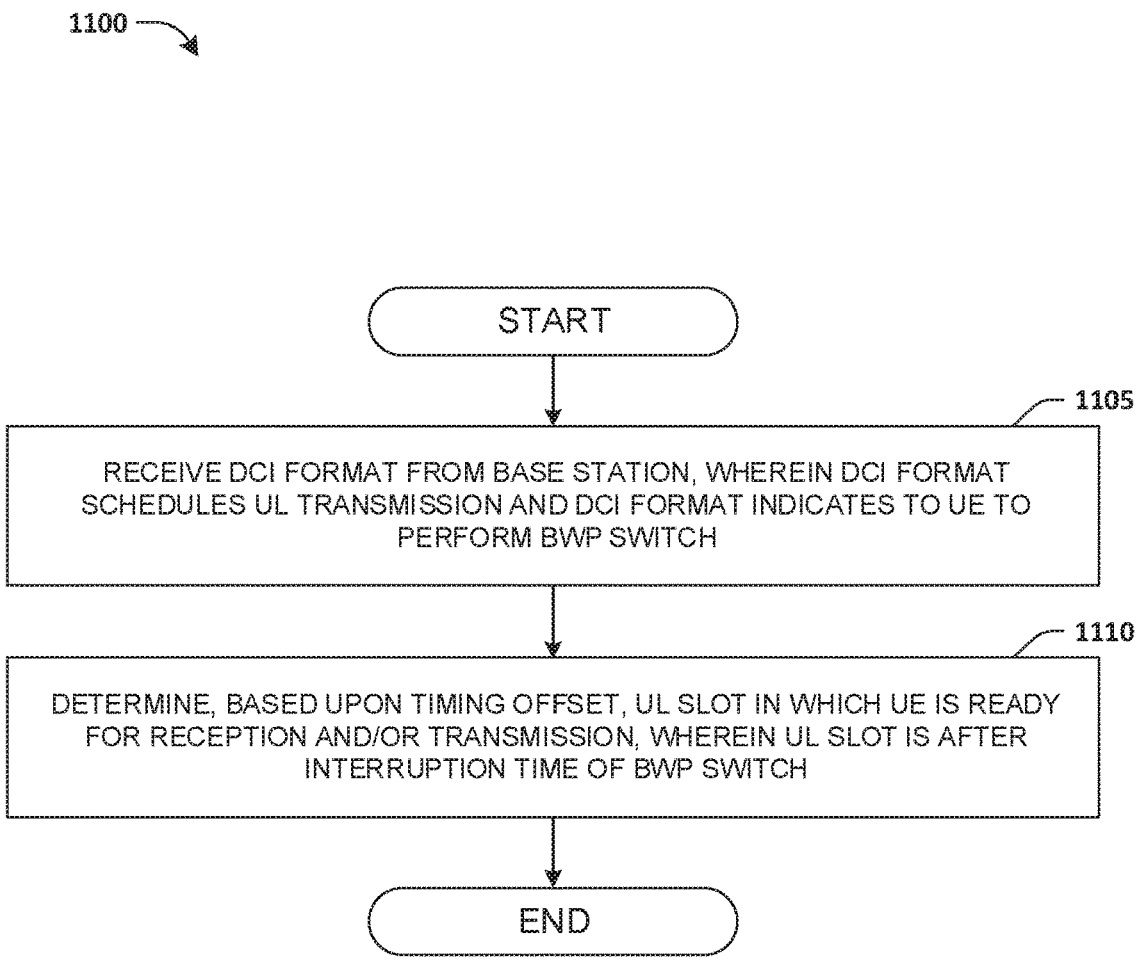
FIG. 11 is a flow chart according to one exemplary embodiment.

FIG. 11 is a flow chart 1100 according to one exemplary embodiment from the perspective of a UE. In step 1105, the UE receives a DCI format from a base station, wherein the DCI format schedules an UL transmission and the DCI format indicates to (and/or instructs) the UE to perform a BWP switch. In step 1110, the UE determines, based upon a timing offset, an UL slot in which the UE is ready for reception and/or transmission, wherein the UL slot is after an interruption time of the BWP switch.

In one embodiment, the DCI format is DCI format 0_1.

In one embodiment, the UE determines, based upon the timing offset, the interruption time of the BWP switch.

In one embodiment, the UE determines, based upon the timing offset, a time duration during which the UE is not required to transmit and/or receive.

In one embodiment, the UE does not use the timing offset to determine a DL slot in which the UE is ready for reception and/or transmission after a second interruption time of a second BWP switch for a second DCI format scheduling a DL transmission.

Referring back to FIGS. 3 and 4, in one exemplary embodiment of a UE, the device 300 includes a program code 312 stored in the memory 310. The CPU 308 could execute program code 312 to enable the UE (i) to receive a DCI format from a base station, wherein the DCI format schedules an UL transmission and the DCI format indicates to (and/or instructs) the UE to perform a BWP switch, and (ii) to determine, based upon a timing offset, an UL slot in which the UE is ready for reception and/or transmission, wherein the UL slot is after an interruption time of the BWP switch. Furthermore, the CPU 308 can execute the program code 312 to perform one, some and/or all of the above-described actions and steps and/or others described herein.

Figure 12:
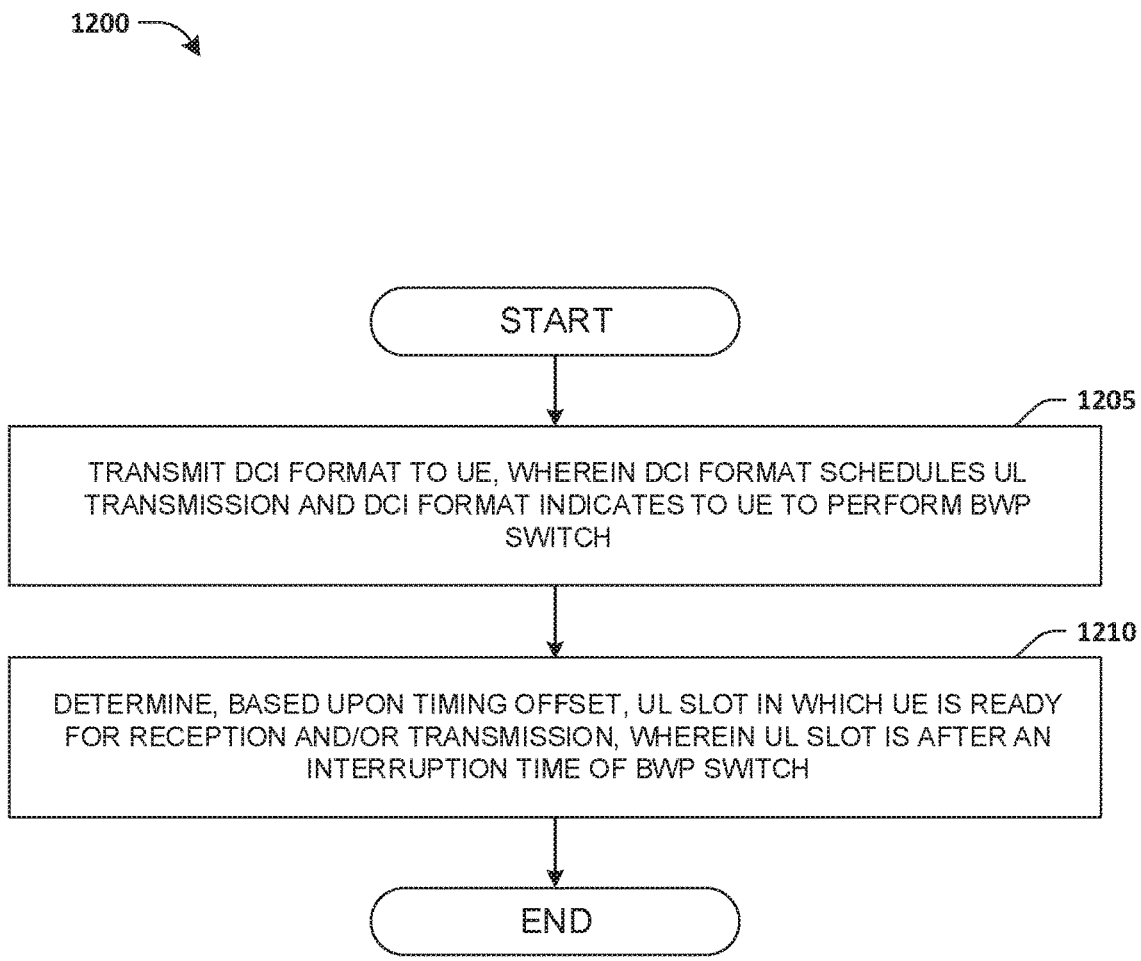
FIG. 12 is a flow chart according to one exemplary embodiment.

FIG. 12 is a flow chart 1200 according to one exemplary embodiment from the perspective of a base station. In step 1205, the base station transmits a DCI format to a UE, wherein the DCI format schedules an UL transmission and the DCI format indicates to (and/or instructs) the UE to perform a BWP switch. In step 1210, the base station determines, based upon a timing offset, an UL slot in which the UE is ready for reception and/or transmission, wherein the UL slot is after an interruption time of the BWP switch.

In one embodiment, the DCI format is DCI format 0_1.

In one embodiment, the base station determines, based upon the timing offset, the interruption time of the BWP switch.

In one embodiment, the based station determines, based upon the timing offset, a time duration during which the UE is not required to transmit and/or receive.

In one embodiment, the base station does not use the TA value to determine a DL slot in which the UE is ready for reception and/or transmission after a second interruption time of a second BWP switch for a second DCI format scheduling a DL transmission.

Referring back to FIGS. 3 and 4, in one exemplary embodiment of a base station, the device 300 includes a program code 312 stored in the memory 310. The CPU 308 could execute program code 312 to enable the base station (i) to transmit a DCI format to a UE, wherein the DCI format schedules an UL transmission and the DCI format indicates to (and/or instructs) the UE to perform a BWP switch, and (ii) to determine, based upon a timing offset, an UL slot in which the UE is ready for reception and/or transmission, wherein the UL slot is after an interruption time of the BWP switch. Furthermore, the CPU 308 can execute the program code 312 to perform one, some and/or all of the above-described actions and steps and/or others described herein.

With respect to FIGS. 11-12, in one embodiment, the interruption time is determined based upon a scheduling delay.

In one embodiment, a slot in which the UE is ready for transmission and/or reception is determined based upon the scheduling delay.

In one embodiment, the UE is not required to transmit and/or receive during a time duration that spans until a slot, wherein the slot is determined based upon the timing offset.

In one embodiment, the UE is not required to transmit and/or receive during a time duration that spans until a slot, wherein the slot is determined based upon the timing offset and the scheduling delay.

In one embodiment, the scheduling delay is indicated by the DCI.

In one embodiment, the timing offset is not indicated by the DCI.

In one embodiment, a duration of the interruption time is equal to the timing offset.

In one embodiment, a duration of the interruption time is equal to a sum of the scheduling delay and the timing offset.

In one embodiment, a duration of the interruption time is equal to a sum of the scheduling delay and the timing offset subtracted by a TA value (e.g. a duration of the interruption time is equal to A+B−C, where A is the scheduling delay, B is the timing offset and C is the TA value).

With respect to FIGS. 9-12, in one embodiment, the TA value is associated with the UE (e.g., the TA value is a TA value of the UE).

In one embodiment, the UE is not required to transmit and/or receive in a cell during the interruption time.

In one embodiment, the UE is not required to transmit and/or receive in a cell during a time period between a DL slot in which the UE receives the DCI and the UL slot in which the UE is ready to perform transmission and/or reception.

In one embodiment, if the DCI format is received in DL slot X and the DCI indicates a scheduling delay with value Y, the UL slot in which the UE is ready to perform transmission and/or reception is UL slot X+Y+Z.

In one embodiment, if the DCI format is received in DL slot X and the DCI indicates a scheduling delay with value Y, the UE is not required to transmit and/or receive in a cell during a time duration that spans from the end of the third symbol of the DL slot X until the beginning of UL slot X+Y+Z, where the third symbol of the DL slot X may correspond to a symbol that is 2 symbols after an initial symbol of the DL slot X.

In one embodiment, if the DCI format is received in DL slot X, the UL slot in which the UE is ready to perform transmission and/or reception is UL slot X+Z.

In one embodiment, if the DCI format is received in DL slot X, the UE is not required to transmit and/or receive in a cell during a time duration that spans from the end of the third symbol of the DL slot X until the beginning of UL slot X+Z.

In one embodiment, Z is determined based upon the timing offset.

In one embodiment, Z is equal to the timing offset.

In one embodiment, Z is determined based upon the TA value for the UE.

In one embodiment, Z is equal to the TA value for the UE.

In one embodiment, the timing offset is the same as (e.g., equal to) a second timing offset applied for UL scheduling.

In one embodiment, the timing offset different than (e.g., not equal to) a second timing offset applied for UL scheduling.

In one embodiment, the timing offset may be broadcasted (such as by the base station and/or a different base station).

In one embodiment, the timing offset is indicated by a RRC configuration (such as a RRC configuration that is transmitted by the base station and/or a different base station).

In one embodiment, the RRC configuration is a configuration for PUSCH.

In one embodiment, the timing offset is indicated by a MAC control element (such as a MAC control element that is transmitted by the base station and/or a different base station).

In one embodiment, the timing offset is indicated by a PDCCH and/or a second DCI format (such as a PDCCH and/or a DCI format that are transmitted by the base station and/or a different base station).

In one embodiment, the second DCI format may be DCI format 0_1.

In one embodiment, the timing offset is used to compensate a round-trip delay.

In one embodiment, the timing offset, that the UE uses for one or more UL scheduling DCIs that indicate to (and/or instruct) the UE to perform one or more BWP switches, is equal to a first value.

In one embodiment, a second timing offset, that the UE uses for one or more UL scheduling DCIs that do not indicate to (and/or instruct) the UE to perform one or more BWP switches, is equal to a second value.

In one embodiment, the first value is the same as (e.g., equal to) the second value.

In one embodiment, the first value is different than (e.g., not equal to) the second value.

In one embodiment, the UL scheduling may be for UL data, UL control and/or UL RS.

In one embodiment, the BWP associated with the BWP switch is an UL BWP (e.g., the BWP switch that is indicated by the DCI format may correspond to switching from one UL BWP to another UL BWP).

Figure 13:
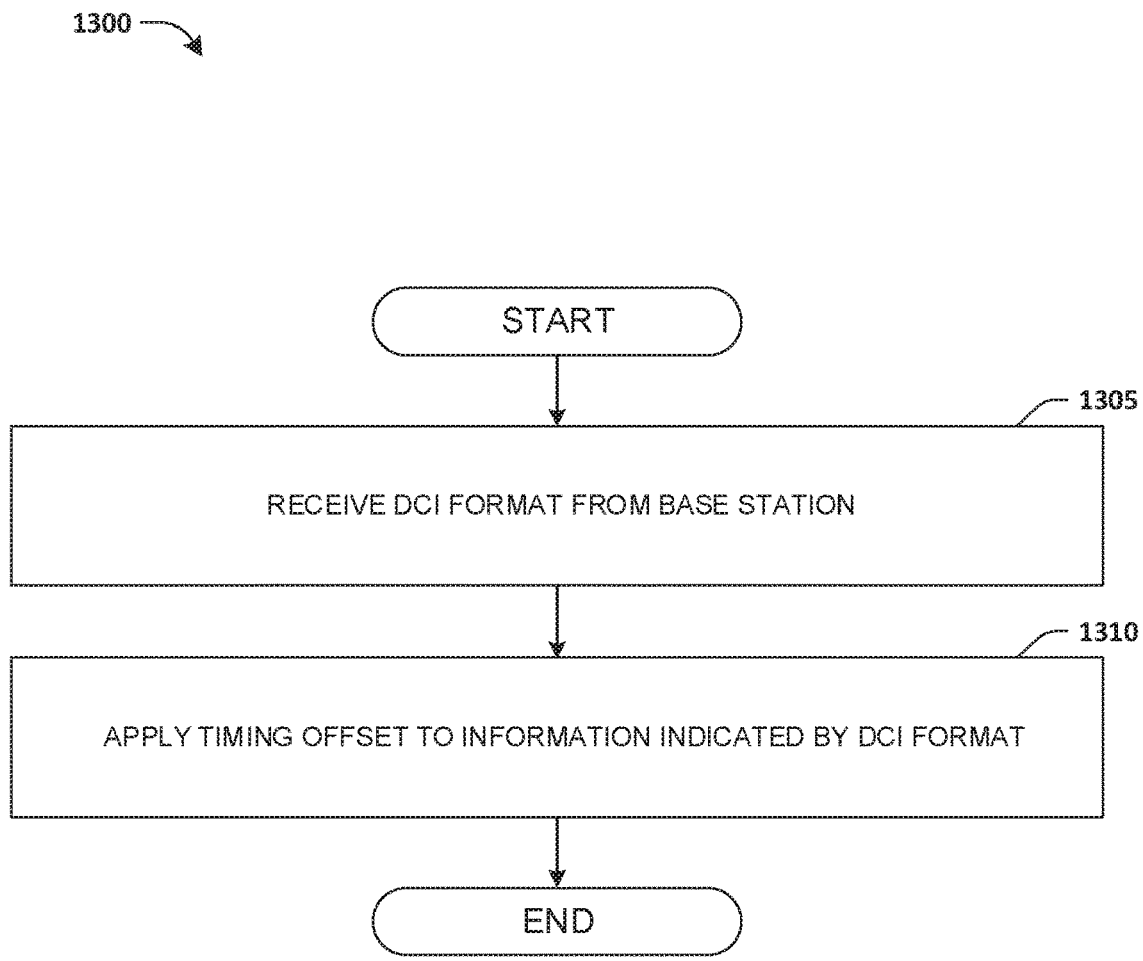
FIG. 13 is a flow chart according to one exemplary embodiment.

FIG. 13 is a flow chart 1300 according to one exemplary embodiment from the perspective of a UE. In step 1305, the UE receives a DCI format from a base station. In step 1310, the UE applies a timing offset to information indicated by the DCI format.

In one embodiment, the timing offset is used to determine slots for which slot formats are indicated by the DCI format (e.g., the slots, to which the slot formats indicated by the DCI format are to be applied, may be identified based upon the timing offset).

In one embodiment, the application of the timing offset to the information indicated by the DCI format comprises determining, based upon the timing offset, slots for which slot formats are indicated by the DCI format (e.g., the application of the timing offset to the information indicated by the DCI format comprises using the timing offset to identify the slots to which the slot formats indicated by the DCI format are to be applied).

In one embodiment, the DCI format is received in slot n, and an initial slot of slots for which slot formats are indicated by the DCI format is slot n+X, wherein X is equal to the timing offset (e.g., the slot n+X corresponds to a slot that is X slots after the slot n in which the DCI format is received). The DCI format could be for slot format indication. The DCI format could be for BWP switch.

In an example, the DCI format is received in slot n and is indicative of a set of slot formats (such as slot formats of a slot format combination) that are applicable to a set of slots, such as a set of UL slots. In the example, the set of slots may be determined and/or identified based upon the timing offset. In the example, the set of slots may start from an initial slot n+X, wherein X is equal to the timing offset (e.g., X and/or the timing offset may be in units of slots).

In one embodiment, the timing offset is determined based upon a TA value of the UE.

In one embodiment, the timing offset is received from the base station.

In one embodiment, the DCI format does not schedule a resource for the UE (e.g., the DCI format does not schedule any resource for the UE).

In one embodiment, the timing offset is broadcasted by the base station.

In one embodiment, the UE applies the timing offset to the information indicated by the DCI format based upon (and/or due to) a TA value of the UE being larger than a threshold TA value.

In one embodiment, the UE uses the timing offset to determine slots for which slot formats are indicated by the DCI format based upon (and/or due to) a TA value of the UE being larger than a threshold TA value.

In one embodiment, the UE applies the timing offset to the information indicated by the DCI format responsive to a determination that a TA value of the UE is larger than a threshold TA value.

In one embodiment, the UE uses the timing offset to determine slots for which slot formats are indicated by the DCI format responsive to a determination that a TA value of the UE is larger than a threshold TA value.

In one embodiment, the application of the timing offset to the information indicated by the DCI format causes the UE to not apply the timing offset to one or more past UL slots (such as UL slots that are before reception of the DCI format) indicated by the DCI format.

In one embodiment, the application of the timing offset to the information indicated by the DCI format is performed by the UE to avoid applying slot formats, indicated by the DCI format, to one or more past UL slots (such as UL slots that are before reception of the DCI format).

In one embodiment, the UE applies the timing offset to the information indicated by the DCI format based upon (and/or due to) the UE operating in a NTN (e.g., the UE applies the timing offset to the information indicated by the DCI format if the UE operates in a NTN).

In one embodiment, the UE uses the timing offset to determine slots for which slot formats are indicated by the DCI format based upon (and/or due to) the UE operating in a NTN (e.g., the UE uses the timing offset to determine slots for which slot formats are indicated by the DCI format if the UE operates in a NTN).

Referring back to FIGS. 3 and 4, in one exemplary embodiment of a UE, the device 300 includes a program code 312 stored in the memory 310. The CPU 308 could execute program code 312 to enable the UE (i) to receive a DCI format from a base station, and (ii) to apply a timing offset to information indicated by the DCI format. Furthermore, the CPU 308 can execute the program code 312 to perform one, some and/or all of the above-described actions and steps and/or others described herein.

Figure 14:
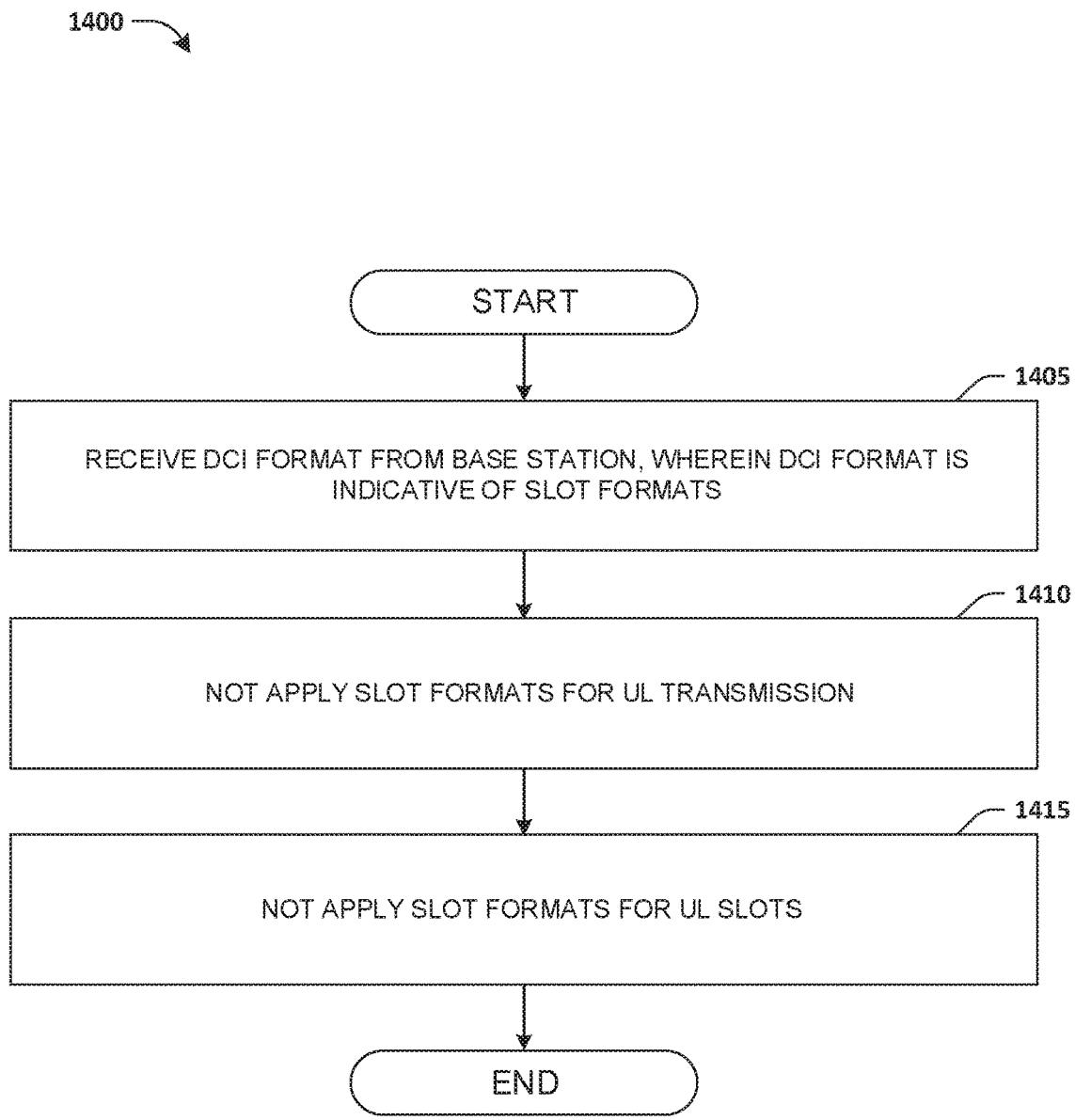
FIG. 14 is a flow chart according to one exemplary embodiment.

FIG. 14 is a flow chart 1400 according to one exemplary embodiment from the perspective of a UE. In step 1405, the UE receives a DCI format from a base station, wherein the DCI format indicative of slot formats. In step 1410, the UE does not apply the slot formats for UL transmission. In step 1415, the UE does not apply the slot formats for UL slots.

In one embodiment, the slot formats indicated by the DCI format are not applied to any UL transmission and are not applied to any UL slot.

In one embodiment, no slot format indicated by the DCI format is applied to any UL transmission and no slot format indicated by the DCI format is applied to any UL slot.

In one embodiment, the UE applies at least some of the slot formats for at least one of DL transmission or one or more DL slots (e.g., one or more slot formats of one or more DL slots may be determined based upon the at least some of the slot formats).

In one embodiment, the slot formats indicated by the DCI format comprise one or more first slot formats and one or more second slot formats. The one or more first slot formats may be applicable to one or more DL slots and the one or more second slot formats may be applicable to one or more UL slots. The UE may apply the one or more first slot formats to the one or more DL slots and the UE may not apply the one or more second slot formats to the one or more UL slots (and/or the UE may not apply the one or more second slot formats to any UL slot).

In one embodiment, the slot formats indicated by the DCI format are applicable to DL slots and the DCI format does not comprise slot formats that are applicable to UL slots.

In one embodiment, the slot formats are not applied for UL transmission and the slot formats are not applied for UL slots based upon (and/or due to) a TA value of the UE being larger than a threshold TA value.

In one embodiment, the slot formats are not applied for UL transmission and the slot formats are not applied for UL slots responsive to a determination that a TA value of the UE is larger than a threshold TA value.

In one embodiment, at least one of the not applying the slot formats for UL transmission or the not applying the slot formats for UL slots cause the UE to not apply the slot formats to one or more past UL slots.

In one embodiment, the UE does not apply the slot formats for UL transmission and/or the UE does not apply the slot formats for UL slots to avoid applying one or more slot formats, indicated by the DCI format, to one or more past UL slots (such as UL slots that are before reception of the DCI format).

Referring back to FIGS. 3 and 4, in one exemplary embodiment of a UE, the device 300 includes a program code 312 stored in the memory 310. The CPU 308 could execute program code 312 to enable the UE (i) to receive a DCI format from a base station, wherein the DCI format is indicative of slot formats, (ii) not to apply the slot formats for UL transmission, and (iii) not to apply the slot formats for UL slots. Furthermore, the CPU 308 can execute the program code 312 to perform one, some and/or all of the above-described actions and steps and/or others described herein.

Figure 15:
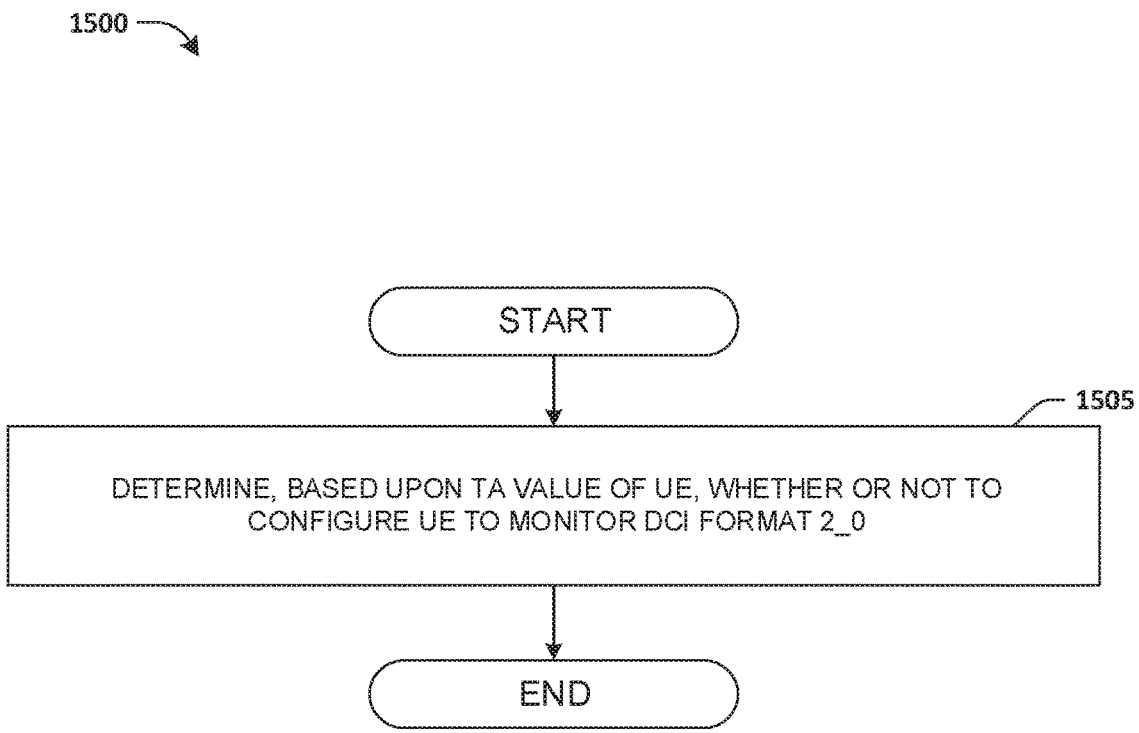
FIG. 15 is a flow chart according to one exemplary embodiment.

FIG. 15 is a flow chart 1500 according to one exemplary embodiment from the perspective of a base station. In step 1505, the base station determines, based upon a TA value of a UE, whether or not to configure the UE to monitor a DCI format 2_0.

In one embodiment, the DCI format 2_0 is indicative of slot formats.

In one embodiment, the base station configures the UE to monitor a DCI format 2_0 based upon (and/or due to) the TA value of the UE being smaller than a threshold TA value.

In one embodiment, the base station configures the UE to monitor a DCI format 2_0 responsive to a determination that the TA value of the UE is smaller than a threshold TA value.

In one embodiment, the base station does not configure the UE to monitor a DCI format 2_0 based upon (and/or due to) the TA value of the UE being larger than a threshold TA value.

In one embodiment, the base station does not configure the UE to monitor a DCI format 2_0 responsive to a determination that the TA value of the UE is larger than a threshold TA value.

In one embodiment, the base station is prohibited from configuring the UE to monitor a DCI format 2_0 if the TA value of the UE is larger than a threshold TA value.

In one embodiment, the base station determines whether or not to configure the UE to monitor a DCI format 2_0 based upon whether or not the base station and/or the UE operate in a NTN.

In one embodiment, the base station does not configure the UE to monitor a DCI format 2_0 based upon (and/or due to) the base station and/or the UE operating in a NTN.

In one embodiment, the base station does not configure the UE to monitor a DCI format 2_0 responsive to a determination that the base station and/or the UE operate in a NTN.

Referring back to FIGS. 3 and 4, in one exemplary embodiment of a base station, the device 300 includes a program code 312 stored in the memory 310. The CPU 308 could execute program code 312 to enable the base station to determine, based upon a TA value of a UE, whether or not to configure the UE to monitor a DCI format 2_0. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 7-15. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 7-15, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a base station). The increased efficiency may be at least due to more efficient operation for slot format indication (and/or dynamic SFI), such as at least due to enabling a device (such as a UE and/or a base station) to determine slots for which slot formats indicated by a DCI format should be applied (such as in scenarios where a TA value is larger than a threshold TA value and/or a propagation delay is larger than a threshold propagation delay). The increased efficiency may be at least due to more efficient BWP switching by a device (such as a UE and/or a base station), such as at least due to enabling the device to determine a slot (e.g., a UL slot) associated with a BWP switch and/or enabling the device to be ready for transmission and/or reception in the slot (such as in scenarios where a TA value is larger than a threshold TA value and/or a propagation delay is larger than a threshold propagation delay).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), comprising:
receiving a Downlink Control Information (DCI) format from a base station; and
applying a timing offset to first information indicated by the DCI format but not to second information indicated by the DCI format, wherein the first information comprises one or more first slot formats and the second information comprises one or more second slot formats, wherein the applying comprises:
determining, by the UE, the one or more first slot formats indicated by the DCI format;
determining, by the UE and based upon the timing offset, one or more slots; and
applying, by the UE, the one or more first slot formats indicated by the DCI format to the one or more slots determined, by the UE, based upon the timing offset.

2. The method of claim 1, wherein:
the receiving the DCI format is performed in slot n.

3. The method of claim 2, wherein:
an initial slot of slots for which slot formats are indicated by the DCI format is slot n+X, wherein X is equal to the timing offset.

4. The method of claim 1, comprising:
determining the timing offset based upon a timing advance (TA) value of the UE.

5. The method of claim 1, comprising:
receiving the timing offset from the base station.

6. The method of claim 1, wherein:
the DCI format does not schedule a resource for the UE.

7. The method of claim 1, wherein:
the timing offset is broadcasted by the base station.

8. The method of claim 1, wherein:
the DCI format is for slot format indication.

9. The method of claim 1, wherein:
the applying the timing offset causes the UE to not apply the timing offset to one or more past uplink (UL) slots indicated by the DCI format.

10. The method of claim 1, wherein:
the DCI format is for bandwidth part (BWP) switch.

11. A method of a User Equipment (UE), comprising:
receiving a Downlink Control Information (DCI) format from a base station, wherein the DCI format is indicative of slot formats;
applying at least some of the slot formats for at least one of downlink (DL) transmission or DL slots; and
upon determining that a timing advance (TA) value of the UE is larger than a threshold TA value:
not applying the slot formats for uplink (UL) transmission; and
not applying the slot formats for UL slots.

12. The method of claim 11, wherein:
at least one of the not applying the slot formats for UL transmission or the not applying the slot formats for UL slots cause the UE to not apply the slot formats to one or more past UL slots.

13. A method of a base station, comprising:
   determining, based upon a timing advance (TA) value of a User Equipment (UE), whether or not to configure the UE to monitor a Downlink Control Information (DCI) format 2_0; and
   based upon the determining, configuring or not configuring the UE to monitor the DCI format 2_0, wherein when the TA value of the UE is smaller than a threshold TA value, the UE is configured to monitor the DCI format 2_0.

14. The method of claim 13, wherein:
   the DCI format 2_0 is indicative of slot formats.

15. The method of claim 13, wherein when the TA value of the UE is larger than the threshold TA value,
   the UE is not configured to monitor the DCI format 2_0.

16. The method of claim 13, wherein when the TA value of the UE is larger than the threshold TA value,
   the base station is prohibited from configuring the UE to monitor a DCI format 2_0.

17. The method of claim 13, wherein the determining whether or not to configure the UE to monitor a DCI format 2_0 is based upon whether or not at least one of the base station or the UE operate in a non-terrestrial network (NTN), the method comprising:
   not configuring the UE to monitor a DCI format 2_0 based upon at least one of the base station or the UE operating in a NTN.

* * * * *